United States Patent
Liu et al.

(10) Patent No.: US 12,299,456 B1
(45) Date of Patent: May 13, 2025

(54) BOOTSTRAPPING FOR COMPUTING DEVICES IMPLEMENTING A RADIO-BASED NETWORK

(71) Applicant: Amazon Technologies, Inc., Seattle, WA (US)

(72) Inventors: Cheng Liu, Flower Mound, TX (US); Hoon Chang, Austin, TX (US); MohammadHossein Zoualfaghari, Woodbridge (GB); Nima Sajadpour, Tigard, OR (US); Robin Satish Harwani, Frisco, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 99 days.

(21) Appl. No.: 18/193,137

(22) Filed: Mar. 30, 2023

(51) Int. Cl.
| | |
|---|---|
| *G06F 15/177* | (2006.01) |
| *G06F 8/61* | (2018.01) |
| *G06F 9/00* | (2018.01) |
| *G06F 9/4401* | (2018.01) |

(52) U.S. Cl.
CPC .............. *G06F 9/4416* (2013.01); *G06F 8/61* (2013.01)

(58) Field of Classification Search
CPC .................................. G06F 9/4416; G06F 8/61
See application file for complete search history.

(56) References Cited

U.S. PATENT DOCUMENTS

| | | | |
|---|---|---|---|
| 2004/0015961 A1* | 1/2004 | Chefalas | G06F 16/9535 709/221 |
| 2011/0167101 A1* | 7/2011 | Hopen | H04L 47/805 709/202 |
| 2013/0019234 A1* | 1/2013 | Pardehpoosh | G06F 21/128 717/170 |
| 2018/0368109 A1* | 12/2018 | Kim | H04W 72/04 |
| 2024/0028441 A1* | 1/2024 | Lan | G06F 11/0709 |

* cited by examiner

*Primary Examiner* — Xuxing Chen
(74) *Attorney, Agent, or Firm* — Perilla Knox & Hildebrandt LLP; Thomas B. Hildebrandt

(57) ABSTRACT

Disclosed are various embodiments for bootstrapping for computing devices implementing functions for a radio-based network. In one embodiment, a request is received from a bootstrap agent executed in a computing device. A unique identifier presented by the bootstrap agent is verified. An installation recipe associated with the unique identifier and specified by a customer associated with the computing device is then determined. A secure communication channel with the bootstrap agent is created. The bootstrap agent installs an installation agent on the computing device. The installation agent installs and configures software on the computing device that implements one or more network functions for a radio-based network of the customer according to the installation recipe.

20 Claims, 10 Drawing Sheets

BOOTSTRAPPING FOR COMPUTING DEVICES IMPLEMENTING A RADIO-BASED NETWORK

BACKGROUND 5G is the fifth-generation technology standard for broadband cellular networks, which is planned eventually to take the place of the fourth-generation (4G) standard of Long-Term Evolution (LTE). 5G technology will offer greatly increased bandwidth, thereby broadening the cellular market beyond smartphones to provide last-mile connectivity to desktops, set-top boxes, laptops, Internet of Things (IoT) devices, and so on. Some 5G cells may employ frequency spectrum similar to that of 4G, while other 5G cells may employ frequency spectrum in the millimeter wave band. Cells in the millimeter wave band will have a relatively small coverage area but will offer much higher throughput than 4G.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
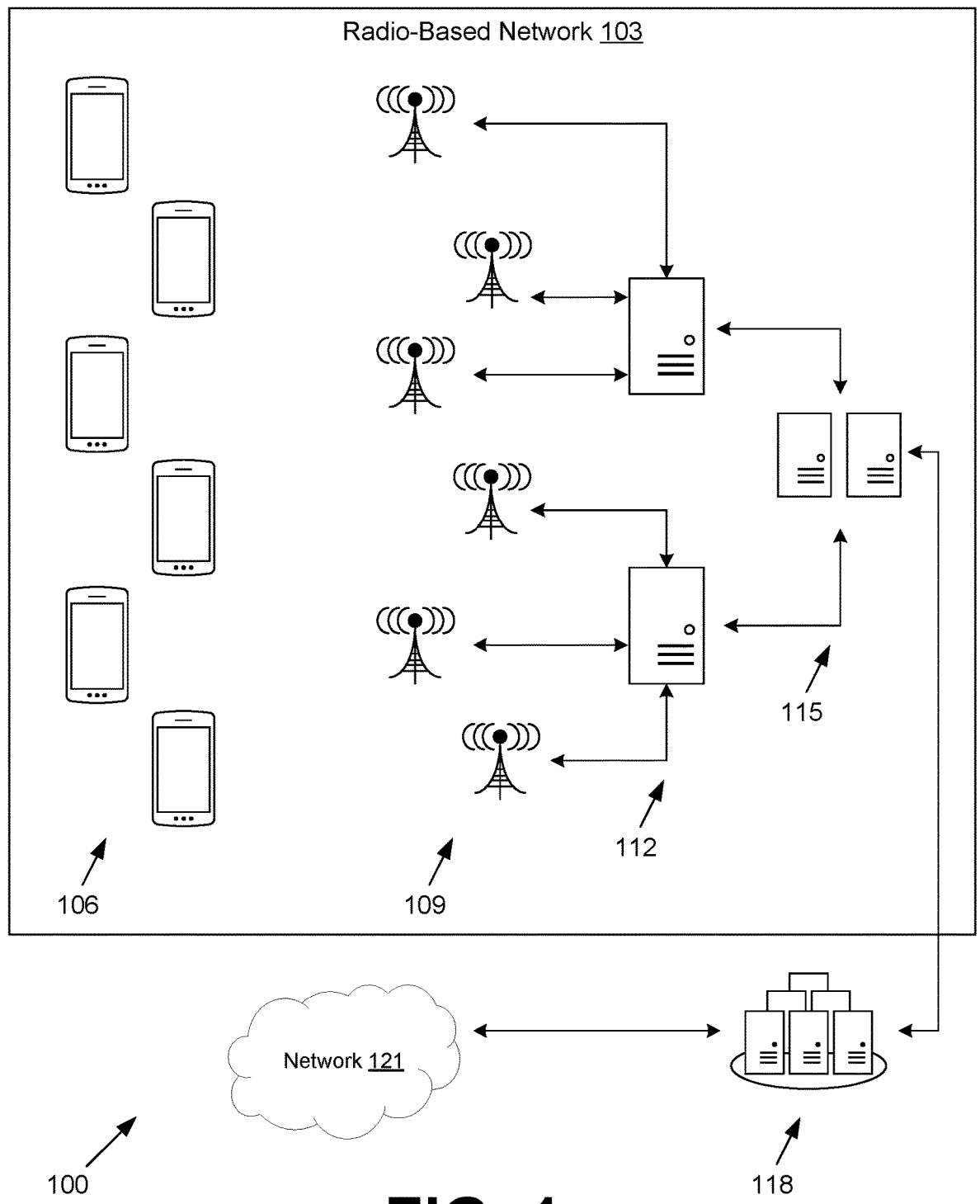
FIG. 1 is a drawing of an example of a communication network that is deployed and managed according to various embodiments of the present disclosure.

The present disclosure relates to bootstrapping of computing devices that implement a radio-based network. A radio-based network, such as a fourth-generation (4G) Long-Term Evolution (LTE) network, a fifth-generation (5G) network, a 4G-5G hybrid core with both 4G and 5G radio access networks (RANs), a sixth-generation (6G) network, or other cellular networks, utilize computing devices to perform network functions. Such computing devices, for example, may implement distributed unit functions, centralized unit functions, and/or core network functions.

Distributed units (DUs) are computing devices that are typically deployed at cell sites of radio access networks (RANs) in radio-based networks. DUs operate at the lower layers of the RAN protocol stack, such as the Radio Link Control (RLC) sublayer, the Medium Access Control (MAC) sublayer, and the physical layer. This is in contrast to centralized units (CUs), which may be deployed at centralized locations and provide support for higher layers of the protocol stack, such as the Service Data Adaptation Protocol (SDAP), the Packet Data Convergence Protocol (PDCP), and the Radio Resource Control (RRC) protocol. Together, the DU and CU may correspond to the next generation node B (gNB) in 5G, which enables user equipment (UEs) to connect to the core network. The DUs interface with one or more radio units (RUs) in order to communicate wirelessly with the UEs.

Deploying the computing devices that implement a radio-based network is typically a time-intensive endeavor that involves many steps. When the hardware is received, an operating system is installed, along with a hypervisor in some cases. If containers are used, a container orchestration service may be installed. Numerous plugins may need to be installed because the generic container orchestration service may not support functionality required by network function containers. Next, a software stack can be configured to implement various network functions. To carry out this deployment, many technicians may be engaged to handle specialized aspects. Preparing computing devices to be connected to the radio-based network may take a month or more in some cases. Further, the labor cost for manual provisioning and deployment of a computing device may amount to twice the cost of the computing device.

Fully preconfiguring the computing devices can be impractical. Customers who operate radio-based networks may have differing requirements. Even a particular customer may operate different platforms or software that vary based upon the cell site or geographic area. There may be dozens or more such permutations, making it difficult to maintain respective canonical installations or "golden" machine images. Also, if an update is released for an operating system component or a software stack component, the machine image may need to be modified, and the preconfigured machine may need to be manually updated upon arrival.

Various embodiments of the present disclosure introduce an end-to-end automated approach to bootstrapping computing devices that implement a radio-based network. The automated bootstrapping approach described herein can reduce deployment times for such computing devices from months to just minutes. Customers are able to generate recipes for deployment, specifying operating systems and other software to be installed on a computing device in a certain order, in addition to configuration parameters. Rather than fully preconfiguring the computing device at the manufacturer, the computing device is instead preconfigured to communicate with an automation service. The automation service, upon authenticating the computing device and creating an encrypted channel, causes the computing device to download and install an operating system, a container orchestration platform, and a software stack that implements functions for a radio-based network.

In various embodiments, the radio-based networks are managed by a cloud network provider on behalf of an organization (e.g., an enterprise, an educational institution, a governmental entity, etc.) or on behalf of a communication service provider. In some cases, the computing devices correspond to virtualized cloud provider network infrastructure at the edge location or cell site. The various network functions may be executed in a container cluster upon the host. In some cases, the cloud provider computing device upon which the network functions are executed includes hardware acceleration for the DU physical layer and/or for virtualization. In various instances, the communication between the DU and the CU may utilize a virtual private cloud network managed by the cloud network provider.

The radio-based network may use a core network infrastructure that may be provisioned dynamically and used in conjunction with one or more radio access networks operated by a cloud provider network and/or a plurality of communication service providers. While the radio-based networks may be provisioned on-demand, the radio-based networks may also be scaled up or down or terminated dynamically, thereby providing organizations with the capability to create an ephemeral radio-based network that may exist during a particular time period or periodically according to a schedule. Further, cell sites may be added to or removed from the radio-based network dynamically on demand. In various scenarios, an organization may create either a private radio-based network for internal use only or a radio-based network open to third-party customers using embodiments of the present disclosure.

Previous deployments of radio-based networks have relied upon manual deployment and configuration at each step of the process. This proved to be extremely time consuming and expensive. Further, in previous generations, software was inherently tied to vendor-specific hardware, thereby preventing customers from deploying alternative software. By contrast, with 5G, hardware is decoupled from the software stack, which allows more flexibility, and allows components of the radio-based network to be executed on cloud provider infrastructure. Using a cloud delivery model for a radio-based network, such as a 5G network, can facilitate handling network traffic from hundreds up to billions of connected devices and compute-intensive applications, while delivering faster speeds, lower latency, and more capacity than other types of networks.

Historically, enterprises have had to choose between performance and price when evaluating their enterprise connectivity solutions. Cellular networks may offer high performance, great indoor and outdoor coverage and advanced Quality of Service (QoS) connectivity features, but private cellular networks can be expensive and complex to manage. While Ethernet and Wi-Fi require less upfront investment and are easier to manage, enterprises often find that they can be less reliable, require a lot of work to get the best coverage, and do not offer QoS features such as guaranteed bit rate, latency and reliability.

Enterprises can freely deploy various 5G devices and sensors across the enterprise—factory floors, warehouses, lobbies, and communications centers—and manage these devices, enroll users, and assign QoS from a management console. With the disclosed technology, customers can assign constant bit rate throughput to all their devices (such as cameras, sensors, or IoT devices), reliable low latency connection to devices running on factory floors, and broadband connectivity to all handheld devices. The disclosed service can manage all the software needed to deliver connectivity that meets the specified constraints and requirements. This enables an entirely new set of applications that have strict QoS or high IoT device density requirements that traditionally have not been able to run on Wi-Fi networks. Further, the disclosed service can provide application development application programming interfaces (APIs) that expose and manage 5G capabilities like QoS, enabling customers to build applications that can fully utilize the latency and bandwidth capabilities of their network without having to understand the details of the network.

Additionally, the disclosed service can provide a private zone to run local applications within a cloud provider network. This private zone can be connected to and effectively part of a broader regional zone, and allows the customer to manage the private zone using the same APIs and tools as used in the cloud provider network. Like an availability zone, the private zone can be assigned a virtual private network subnet. An API can be used to create and assign subnets to all zones that the customer wishes to use, including the private zone and existing other zones. A management console may offer a simplified process for creating a private zone. Virtual machine instances and containers can be launched in the private zone just as in regional zones. Customers can configure a network gateway to define routes, assign IP addresses, set up network address translation (NAT), and so forth. Automatic scaling can be used to scale the capacity of virtual machine instances or containers as needed in the private zone. The same management and authentication APIs of the cloud provider network can be used within the private zone. In some cases, since cloud services available in the regional zone can be accessed remotely from private zones over a secure connection, these cloud services can be accessed without having to upgrade or modify the local deployment.

Various embodiments of the present disclosure may also bring the concept of elasticity and utility computing from the cloud computing model to radio-based networks and associated core networks. For example, the disclosed techniques can run core and radio access network functions and associated control plane management functions on cloud provider infrastructure, creating a cloud native core network and/or a cloud native radio access network (RAN). Such core and RAN network functions can be based on the 3rd Generation Partnership Project (3GPP) specifications in some implementations. By providing a cloud-native radio-based network, a customer may dynamically scale its radio-based network based on utilization, latency requirements, and/or other factors. Customers may also configure thresholds to receive alerts relating to radio-based network usage and excess capacity usage of their provisioned infrastructure, in order to more effectively manage provisioning of new infrastructure or deprovisioning of existing infrastructure based on their dynamic networking and workload requirements.

As one skilled in the art will appreciate in light of this disclosure, certain embodiments may be capable of achieving certain advantages, including some or all of the following: (1) improving deployment efficiency by reducing preparation time for computing devices used to implement radio-based networks; (2) improving the security of the deployment process by utilizing an encrypted secure channel that requires proving automation service identity and proving recipient hardware identity; (3) improving security of computing devices by ensuring that updated software is installed at initial deployment, rather than using a superseded machine image; (4) improving flexibility of computing devices by allowing computing devices implementing a radio-based network to be securely decommissioned and recommissioned for other customers; and so forth.

Among the benefits of the present disclosure is the ability to deploy and chain network functions together to deliver an end-to-end service that meets specified constraints and requirements. According to the present disclosure, network functions organized into microservices work together to provide end-to-end connectivity. One set of network functions are part of a radio network, running in cell towers and performing wireless signal to IP conversion. Other network functions run in large data centers performing subscriber related business logic and routing IP traffic to the internet and back. For applications to use the new capabilities of 5G such as low latency communication and reserved bandwidth, both of these types of network functions need to work together to appropriately schedule and reserve wireless spectrum, and perform real time compute and data processing. The presently disclosed techniques provide edge location hardware (as described further below) integrated with network functions that run across the entire network, from cell sites to Internet break-outs, and orchestrate the network functions to meet required Quality of Service (QoS) constraints. This enables an entirely new set of applications that have strict QoS requirements, from factory-based Internet of Things (IoT), to augmented reality (AR), to virtual reality (VR), to game streaming, to autonomous navigation support for connected vehicles, that previously could not run on a mobile network.

The described "elastic 5G" service provides and manages all of the hardware, software and network functions, required to build a network. In some embodiments, the network functions may be developed and managed by the cloud service provider; however, the described control plane can manage network functions across a range of providers, so that customers can use a single set of APIs to call and manage their choice of network functions on cloud infrastructure. The elastic 5G service beneficially automates the creation of an end-to-end 5G network, from hardware to network functions thus reducing the time to deploy and the operational cost of operating the network. By providing APIs that expose network capabilities, the disclosed elastic 5G service enables applications to simply specify the desired QoS as constraints and then deploys and chains the network functions together to deliver an end-to-end service that meets the specified requirements, thus making it possible to easily build new applications.

The present disclosure describes embodiments relating to the creation and management of a cloud native 5G core and/or a cloud native 5G RAN, and associated control plane components. Cloud native refers to an approach to building and running applications that exploits the advantages of the cloud computing delivery model such as dynamic scalability, distributed computing, and high availability (including geographic distribution, redundancy, and failover). Cloud native refers to how these applications are created and deployed to be suitable for deployment in a public cloud. While cloud native applications can be (and often are) run in the public cloud, they also can be run in an on-premises data center. Some cloud native applications can be containerized, for example, having different parts, functions, or subunits of the application packaged in their own containers, which can be dynamically orchestrated so that each part is actively scheduled and managed to optimize resource utilization. These containerized applications can be architected using a microservices architecture to increase the overall agility and maintainability of the applications.

In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environments from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed core and RAN software may follow a microservices architecture such that the described radio-based networks are composed of independent subunits that can be deployed and scaled on demand.

Turning now to FIG. 1, shown is an example of a communication network 100 that is deployed and managed according to various embodiments of the present disclosure. The communication network 100 includes a radio-based network (RBN) 103, which may correspond to a cellular network such as a fourth-generation (4G) Long-Term Evolution (LTE) network, a fifth-generation (5G) network, a 4G-5G hybrid core with both 4G and 5G RANs, a sixth-generation (6G) network, or another network that provides wireless network access. The radio-based network 103 may be operated by a cloud service provider for an enterprise, a non-profit, a school system, a governmental entity, a third-party communication service provider, or another organization. Although referred to as a private network, the radio-based network 103 may use private network addresses or public network addresses in various embodiments.

Various deployments of the radio-based network 103 can include one or more of a core network and a RAN network, as well as a control plane for running the core and/or RAN network on cloud provider infrastructure. As described above, these components can be developed in a cloud native fashion, for example using a microservices architecture, such that centralized control and distributed processing is used to scale traffic and transactions efficiently. These components may be based on the 3GPP specifications by following an application architecture in which control plane and user plane processing is separated (CUPS Architecture).

The radio-based network 103 provides wireless network access to a plurality of wireless devices 106, which may be mobile devices or fixed location devices. In various examples, the wireless devices 106 may include smartphones, connected vehicles, IoT devices, sensors, machinery (such as in a manufacturing facility), hotspots, and other devices. The wireless devices 106 are sometimes referred to as UE or customer premises equipment (CPE).

The radio-based network 103 can include capacity provisioned on one or more RANs that provide the wireless network access to the plurality of wireless devices 106 through a plurality of cells 109. The RANs may be operated by a cloud network provider or different communication service providers. Each of the cells 109 may be equipped with one or more antennas and one or more radio units that send and receive wireless data signals to and from the wireless devices 106. The antennas may be configured for one or more frequency bands, and the radio units may also be frequency agile or frequency adjustable. The antennas may be associated with a certain gain or beamwidth in order to focus a signal in a particular direction or azimuthal range, potentially allowing reuse of frequencies in a different direction. Further, the antennas may be horizontally, vertically, or circularly polarized. In some examples, a radio unit may utilize multiple-input, multiple-output (MIMO) technology to send and receive signals. As such, the RAN implements a radio access technology to enable radio connection with wireless devices 106, and provides connection with the radio-based network's core network. Components of the RAN include a base station and antennas that cover a given physical area, as well as required core network items for managing connections to the RAN.

Data traffic is often routed through a fiber transport network consisting of multiple hops of layer 3 routers (e.g., at aggregation sites) to the core network. The core network is typically housed in one or more data centers. The core network typically aggregates data traffic from end devices, authenticates subscribers and devices, applies personalized policies, and manages the mobility of the devices before routing the traffic to operator services or the Internet. A 5G Core for example can be decomposed into a number of microservice elements with control and user plane separation. Rather than physical network elements, a 5G Core can comprise virtualized, software-based network functions (deployed for example as microservices) and can therefore be instantiated within Multi-access Edge Computing (MEC) cloud infrastructures. The network functions of the core network can include a User Plane Function (UPF), Access and Mobility Management Function (AMF), and Session Management Function (SMF), described in more detail below. For data traffic destined for locations outside of the communication network 100, network functions typically include a firewall through which traffic can enter or leave the communication network 100 to external networks such as the Internet or a cloud provider network. Note that in some embodiments, the communication network 100 can include facilities to permit traffic to enter or leave from sites further downstream from the core network (e.g., at an aggregation site or radio-based network 103).

The UPF provides an interconnect point between the mobile infrastructure and the Data Network (DN), i.e. encapsulation and decapsulation of General Packet Radio Service (GPRS) tunneling protocol for the user plane (GTP-U). The UPF can also provide a session anchor point for providing mobility within the RAN, including sending one or more end marker packets to the RAN base stations. The UPF can also handle packet routing and forwarding, including directing flows to specific data networks based on traffic matching filters. Another feature of the UPF includes per-flow or per-application QoS handling, including transport level packet marking for uplink (UL) and downlink (DL), and rate limiting. The UPF can be implemented as a cloud native network function using modern microservices methodologies, for example being deployable within a serverless framework (which abstracts away the underlying infrastructure that code runs on via a managed service).

The AMF can receive the connection and session information from the wireless devices 106 or the RAN and can handle connection and mobility management tasks. For example, the AMF can manage handovers between base stations in the RAN. In some examples the AMF can be considered as the access point to the 5G core, by terminating certain RAN control plane and wireless device 106 traffic. The AMF can also implement ciphering and integrity protection algorithms.

The SMF can handle session establishment or modification, for example by creating, updating and removing Protocol Data Unit (PDU) sessions and managing session context within the UPF. The SMF can also implement Dynamic Host Configuration Protocol (DHCP) and IP Address Management (IPAM). The SMF can be implemented as a cloud native network function using modern microservices methodologies.

Various network functions to implement the radio-based network 103 may be deployed in distributed computing devices 112, which may correspond to general-purpose computing devices configured to perform the network functions. For example, the distributed computing devices 112 may execute one or more virtual machine instances that are configured in turn to execute one or more services that perform the network functions. In one embodiment, the distributed computing devices 112 are ruggedized machines that are deployed at each cell site. The distributed computing devices 112 may be operated as an extension of a cloud provider network, with DU functions being executed, for example, by a container cluster upon the distributed computing devices 112. Further, the distributed computing devices 112 may be managed by the cloud provider network.

By contrast, one or more centralized computing devices 115 may perform various network functions at a central site operated by the customer. For example, the centralized computing devices 115 may be centrally located on premises of the customer in a conditioned server room. The centralized computing devices 115 may execute one or more virtual machine instances that are configured in turn to execute one or more services that perform the network functions. In some cases, the centralized computing devices 115 may be located in a data center of a cloud provider network, rather than upon a customer's premises.

In one or more embodiments, network traffic from the radio-based network 103 is backhauled to one or more core computing devices 118 that may be located at one or more data centers situated remotely from the customer's site. The core computing devices 118 may also perform various network functions, including routing network traffic to and from the network 121, which may correspond to the Internet and/or other external public or private networks. The core computing devices 118 may perform functionality related to the management of the communication network 100 (e.g., billing, mobility management, etc.) and transport functionality to relay traffic between the communication network 100 and other networks. The core network sits between the RAN and external networks, such as the Internet and the public switched telephone network, and performs features such as authentication of UE, secure session management, user accounting, and handover of mobile UE between different RAN sites.

Collectively, the radio unit (RU), distributed unit (DU), and centralized unit (CU) convert the analog radio signal received from the antenna into a digital packet that can be routed over a network, and similarly they convert digital packets into radio signals that can be transmitted by the antenna. This signal transformation is accomplished by a sequence of network functions which can be distributed amongst the RU, DU, and CU in various ways to achieve different balances of latency, throughput, and network performance. These are referred to as "functional splits" of the RAN.

The network functions implemented in the RAN correspond to the lowest three network layers in the seven-layer OSI model of computer networking. The physical Layer, PHY, or layer 1 (L1) is the first and lowest layer in the OSI model. In a radio-based network 103, the PHY is the layer that sends and receives radio signals. This can be split into two portions: a "high PHY" and "low PHY." Each of these can be considered a network function. The high PHY converts binary bits into electrical pulses that represent the binary data, and the low PHY then converts these electric pulses into radio waves to be transmitted wirelessly by the antennae. The PHY similarly converts received radio waves into a digital signal. This layer may be implemented by a specialized PHY chip.

The PHY interfaces with the data link layer—layer 2 (L2) in the OSI model. The primary task of the L2 is to provide an interface between the higher transport layers and the PHY. The 5G L2 has three sublayers: media access control (MAC), Radio Link Control (RLC), and Packet Data Convergence Protocol (PDCP). Each of these can be considered a network function. The PDCP provides security of radio resource control (RRC) traffic and signaling data, sequence numbering and sequential delivery of RRC messages and IP packets, and IP packet header compression. The RLC protocol provides control of the radio link. The MAC protocol maps information between logical and transport channels.

The data link layer interfaces with layer 3 (L3) in the OSI model, the network layer. The 5G L3 is also referred to as the Radio Resource Control (RRC) layer and is responsible for functions such as packet forwarding, quality of service management, and the establishment, maintenance, and release of a RRC connection between the UE and RAN.

Various functional splits can be chosen for a RAN. The functional splits define different sets of the L1 and L2 functions which are run on the RU versus on the CU and DU. The L3 is also run on the CU. In a RAN architecture following split 7, for example, the functionality of the baseband unit (BBU) used in previous wireless network generations is split into two functional units: the DU which is responsible for real time L1 and L2 scheduling functions, and the CU which is responsible for non-real time, higher L2 and L3 functions. By contrast, in a RAN architecture following split 2, for example, only the PDCP from L2 is handled by the DU and CU, while RLC, MAC, PHY, and radio-frequency signals (RF) are handled by the RU. In split 5, for example, the DU and CU handle PDCP, RLC, and part of the MAC functions, while the RU handles part of the MAC as well as PHY and RF. In split 6, for example, the DU and CU handle PDCP, RLC, MAC, and the RU handles only PHY and RF. In split 8, for example, the DU and CU handle PDCP, RLC, MAC, and PHY, while the RU handles just RF.

Figure 2A:
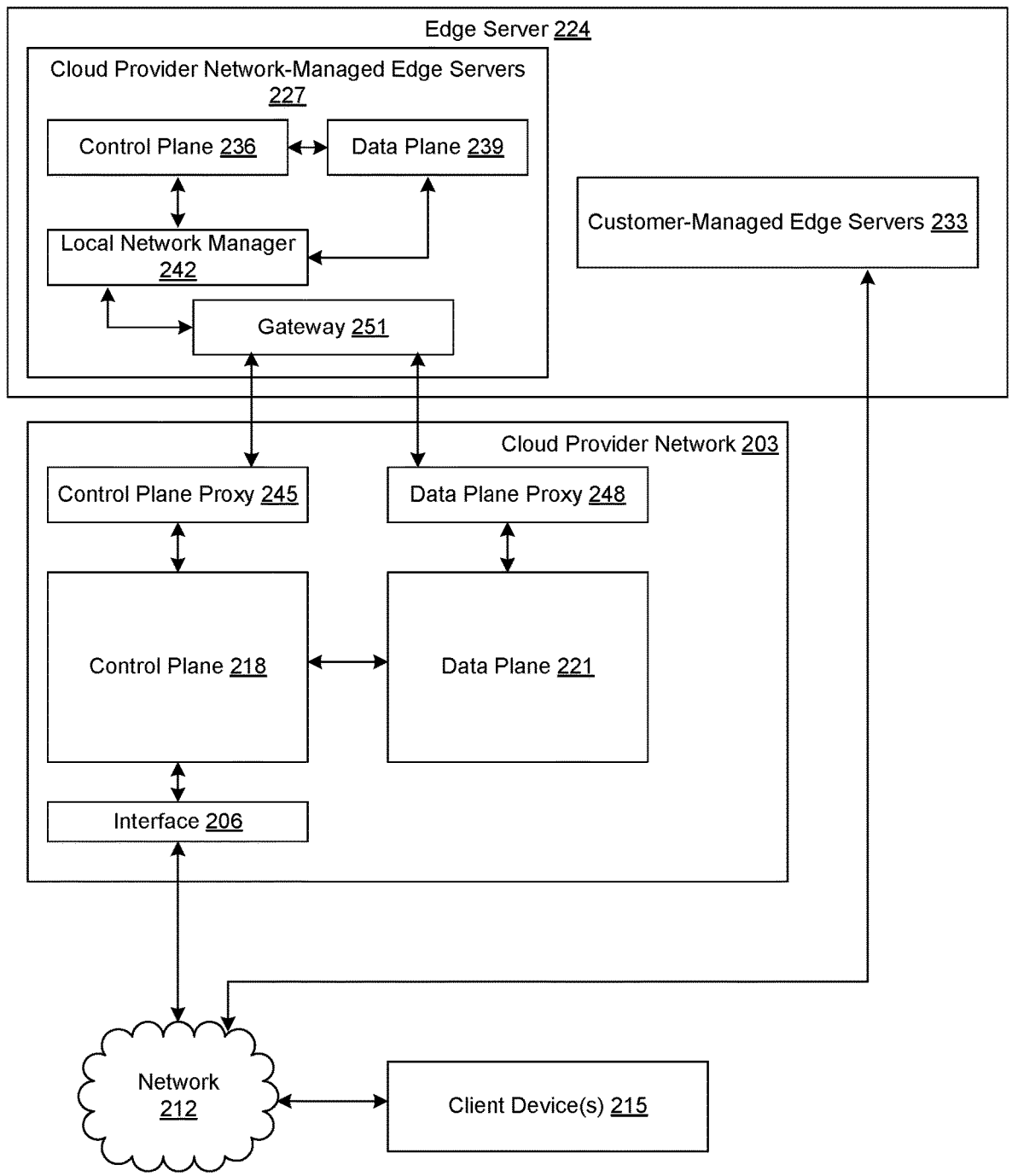
FIG. 2A illustrates an example of a networked environment including a cloud provider network and further including various edge servers of the cloud provider network, which may be used in various locations within the communication network of FIG. 1, according to some embodiments of the present disclosure.

FIG. 2A illustrates an example of a networked environment 200 including a cloud provider network 203 and further including various edge servers of the cloud provider network 203, which may be used in combination with on-premise customer deployments within the communication network 100 of FIG. 1, according to some embodiments. A cloud provider network 203 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 203 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 203 resources and services, and configure and manage telecommunications networks such as 5G networks, using various interfaces 206 (e.g., APIs) via intermediate network(s) 212. An API refers to an interface 206 and/or communication protocol between a client device 215 and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network 203, enabling the development of applications that interact with resources and services hosted in the cloud provider network 203. APIs can also enable different services of the cloud provider network 203 to exchange data with one another. Users can choose to deploy their virtual computing systems to provide network-based services for their own use and/or for use by their customers or clients.

The cloud provider network 203 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 203, for example it may not be possible to route from a substrate network address to an address in a production network that runs services of the cloud provider, or to a customer network that hosts customer resources.

The cloud provider network 203 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 203. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 203 for routing packets between endpoints.

As illustrated, the traffic and operations of the cloud provider network substrate may broadly be subdivided into two categories in various embodiments: control plane traffic carried over a logical control plane 218 and data plane operations carried over a logical data plane 221. While the data plane 221 represents the movement of user data through the distributed computing system, the control plane 218 represents the movement of control signals through the distributed computing system. The control plane 218 generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 221 includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 203 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 221 can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or "hardware virtualization service") of the cloud provider network 203. The virtualized computing service may be part of the control plane 218, allowing customers to issue commands via an interface 206 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 221 can also include one or more block store servers, which can include persistent storage for storing volumes of customer data as well as software for managing these volumes. These block store servers can support a managed block storage service of the cloud provider network 203. The managed block storage service may be part of the control plane 218, allowing customers to issue commands via the interface 206 (e.g., an API) to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 221 can also include one or more object store servers, which represent another type of storage within the cloud provider network. The object storage servers include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

An edge server 224 provides resources and services of the cloud provider network 203 within a separate network, such as a telecommunications network, thereby extending functionality of the cloud provider network 203 to new locations (e.g., for reasons related to latency in communications with customer devices, legal compliance, security, etc.). In some implementations, an edge server 224 can be configured to provide capacity for cloud-based workloads to run within the telecommunications network. In some implementations, an edge server 224 can be configured to provide the core and/or RAN functions of the telecommunications network, and may be configured with additional hardware (e.g., radio access hardware). Some implementations may be configured to allow for both, for example by allowing capacity unused by core and/or RAN functions to be used for running cloud-based workloads.

As indicated, such edge servers 224 can include cloud provider network-managed edge servers 227 (e.g., formed by servers located in a cloud provider-managed facility separate from those associated with the cloud provider network 203), customer-managed edge servers 233 (e.g., formed by servers located on-premise in a customer or partner facility), among other possible types of substrate extensions. In some embodiments, a customer-managed edge server 233 may be directly connected to the network 212, such as a customer-operated network, thereby bypassing a connection through the cloud provider network 203.

As illustrated in the example edge server 224, an edge server 224 can similarly include a logical separation between a control plane 236 and a data plane 239, respectively extending the control plane 218 and data plane 221 of the cloud provider network 203. In some embodiments, the edge server 224, such as the customer-managed edge server 233, may have no control plane 236 or a minimal control plane 236. The edge server 224 may be configured, e.g., by the cloud provider network operator, with an appropriate combination of hardware with software and/or firmware elements to support various types of computing-related resources, and to do so in a manner that mirrors the experience of using the cloud provider network 203. For example, one or more edge server location servers can be provisioned by the cloud provider for deployment within an edge server 224. As described above, the cloud provider network 203 may offer a set of predefined instance types, each having varying types and quantities of underlying hardware resources. Each instance type may also be offered in various sizes. In order to enable customers to continue using the same instance types and sizes in an edge server 224 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the edge server location servers. This can improve utilization of computing resources within the edge location by allowing for better packing of running instances on servers, and also provides a seamless experience regarding instance usage across the cloud provider network 203 and the cloud provider network-managed edge server 227.

The edge server 224 can host one or more compute instances. Compute instances can be VMs, or containers that package up code and all its dependencies, so that an application can run quickly and reliably across computing environments (e.g., including VMs and microVMs). In addition, the servers may host one or more data volumes, if desired by the customer. In the region of a cloud provider network 203, such volumes may be hosted on dedicated block store servers. However, due to the possibility of having a significantly smaller capacity at an edge server 224 than in the region, an optimal utilization experience may not be provided if the edge server 224 includes such dedicated block store servers. Accordingly, a block storage service may be virtualized in the edge server 224, such that one of the VMs runs the block store software and stores the data of a volume. Similar to the operation of a block storage service in the region of a cloud provider network 203, the volumes within an edge server 224 may be replicated for durability and availability. The volumes may be provisioned within their own isolated virtual network within the edge server 224. The compute instances and any volumes collectively make up a data plane 239 extension of the provider network data plane 221 within the edge server 224.

The servers within an edge server 224 may, in some implementations, host certain local control plane components, for example, components that enable the edge server 224 to continue functioning if there is a break in the connection back to the cloud provider network 203. Examples of these components include a migration manager that can move compute instances between edge servers 224 if needed to maintain availability, and a key value data store that indicates where volume replicas are located. However, generally the control plane 236 functionality for an edge server 224 will remain in the cloud provider network 203 in order to allow customers to use as much resource capacity of the edge server 224 as possible.

The migration manager may have a centralized coordination component that runs in the region, as well as local controllers that run on the edge servers 224 (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at an edge server 224 may be designed by the cloud provider to run on the cloud provider substrate network, and this software may be enabled to run unmodified in an edge server 224 by using local network manager(s) 242 to create a private replica of the substrate network within the edge location (a "shadow substrate"). The local network manager(s) 242 can run on edge server 224 servers and bridge the shadow substrate with the edge server 224 network, for example, by acting as a virtual private network (VPN) endpoint or endpoints between the edge server 224 and the proxies 245, 248 in the cloud provider network 203 and by implementing the mapping service (for traffic encapsulation and decapsulation) to relate data plane traffic (from the data plane proxies 248) and control plane traffic (from the control plane proxies 245) to the appropriate server(s). By implementing a local version of the provider network's substrate-overlay mapping service, the local network manager(s) 242 allow resources in the edge server 224 to seamlessly communicate with resources in the cloud provider network 203. In some implementations, a single local network manager 242 can perform these actions for all servers hosting compute instances in an edge server 224. In other implementations, each of the server hosting compute instances may have a dedicated local network manager 242. In multi-rack edge locations, inter-rack communications can go through the local network managers 242, with local network managers maintaining open tunnels to one another.

Edge server locations can utilize secure networking tunnels through the edge server 224 network to the cloud provider network 203, for example, to maintain security of customer data when traversing the edge server 224 network and any other intermediate network (which may include the public internet). Within the cloud provider network 203, these tunnels are composed of virtual infrastructure components including isolated virtual networks (e.g., in the overlay network), control plane proxies 245, data plane proxies 248, and substrate network interfaces. Such proxies 245, 248 may be implemented as containers running on compute instances.

In some embodiments, each server in an edge server 224 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network 203 manages the cloud provider network-side lifecycle of these tunnels and their components, for example, by provisioning them automatically when needed and maintaining them in a healthy operating state. In some embodiments, a direct connection between an edge server 224 location and the cloud provider network 203 can be used for control and data plane communications. As compared to a VPN through other networks, the direct connection can provide constant bandwidth and more consistent network performance because of its relatively fixed and stable network path.

A control plane (CP) proxy 245 can be provisioned in the cloud provider network 203 to represent particular host(s) in an edge location. CP proxies 245 are intermediaries between the control plane 218 in the cloud provider network 203 and control plane targets in the control plane 236 of edge server 224. That is, CP proxies 245 provide infrastructure for tunneling management API traffic destined for edge server out of the region substrate and to the edge server 224. For example, a virtualized computing service of the cloud provider network 203 can issue a command to a VMM of an edge server 224 to launch a compute instance. A CP proxy 245 maintains a tunnel (e.g., a VPN) to a local network manager 242 of the edge server 224. The software implemented within the CP proxies 245 ensures that only well-formed API traffic leaves from and returns to the substrate. CP proxies 245 provide a mechanism to expose remote servers on the cloud provider substrate while still protecting substrate security materials (e.g., encryption keys, security tokens) from leaving the cloud provider network 203. The one-way control plane traffic tunnel imposed by the CP proxies 245 also prevents any (potentially compromised) devices from making calls back to the substrate. CP proxies 245 may be instantiated one-for-one for VMs at an edge server 224 or may be able to manage control plane traffic for multiple VMs.

A data plane (DP) proxy 248 can also be provisioned in the cloud provider network 203 to represent particular VMs in an edge server 224. The DP proxy 248 acts as a shadow or anchor of the server(s) and can be used by services within the cloud provider network 203 to monitor the health of the host (including its availability, used/free compute and capacity, used/free storage and capacity, and network bandwidth usage/availability). The DP proxy 248 also allows isolated virtual networks to span edge servers 224 and the cloud provider network 203 by acting as a proxy for server(s) in the cloud provider network 203. Each DP proxy 248 can be implemented as a packet-forwarding compute instance or container. As illustrated, each DP proxy 248 can maintain a VPN tunnel with a local network manager 242 that manages traffic to the server(s) that the DP proxy 248 represents. This tunnel can be used to send data plane traffic between the edge server(s) and the cloud provider network 203. Data plane traffic flowing between an edge server 224 and the cloud provider network 203 can be passed through DP proxies 248 associated with that edge server 224. For data plane traffic flowing from an edge server 224 to the cloud provider network 203, DP proxies 248 can receive encapsulated data plane traffic, validate it for correctness, and allow it to enter into the cloud provider network 203. DP proxies 248 can forward encapsulated traffic from the cloud provider network 203 directly to an edge server 224.

Local network manager(s) 242 can provide secure network connectivity with the proxies 245, 248 established in the cloud provider network 203. After connectivity has been established between the local network manager(s) 242 and the proxies 245, 248, customers may issue commands via the interface 206 to instantiate compute instances (and/or perform other operations using compute instances) using edge server resources in a manner analogous to the way in which such commands would be issued with respect to compute instances hosted within the cloud provider network 203. From the perspective of the customer, the customer can now seamlessly use local resources within an edge server 224 (as well as resources located in the cloud provider network 203, if desired). The compute instances set up on a server at an edge server 224 may communicate both with electronic devices located in the same network, as well as with other resources that are set up in the cloud provider network 203, as desired. A local gateway 251 can be implemented to provide network connectivity between an edge server 224 and a local network (e.g., a network of the customer).

There may be circumstances that necessitate the transfer of data between the object storage service and an edge server 224. For example, the object storage service may store machine images used to launch VMs, as well as snapshots representing point-in-time backups of volumes. The object gateway can be provided on an edge server or a specialized storage device, and provide customers with configurable, per-bucket caching of object storage bucket contents in their edge server 224 to minimize the impact of edge server-region latency on the customer's workloads. The object gateway can also temporarily store snapshot data from snapshots of volumes in the edge server 224 and then sync with the object servers in the region when possible. The object gateway can also store machine images that the customer designates for use within the edge server 224 or on the customer's premises. In some implementations, the data within the edge server 224 may be encrypted with a unique key, and the cloud provider can limit keys from being shared from the region to the edge server 224 for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and an edge server bucket can be created (on the object store servers) to store snapshot data and machine image data using the edge server encryption key.

In the manner described above, an edge server 224 forms an edge location, in that it provides the resources and services of the cloud provider network 203 outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "local zones," "edge zones," or "distributed cloud edge zones" (due to being near to customer workloads at the "edge" of the network). An edge zone may be connected in various ways to a publicly accessible network such as the Internet, for example directly, via another network, or via a private connection to a region. Although typically an edge zone would have more limited capacity than a region, in some cases an edge zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only by the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In the example of FIG. 1, the distributed computing devices 112 (FIG. 1), the centralized computing devices 115 (FIG. 1), and the core computing devices 118 (FIG. 1) may be implemented as edge servers 224 of the cloud provider network 203. The installation or siting of edge servers 224 within a communication network 100 can vary subject to the particular network topology or architecture of the communication network 100. Edge servers 224 can generally be connected anywhere the communication network 100 can break out packet-based traffic (e.g., IP based traffic). Additionally, communications between a given edge server 224 and the cloud provider network 203 typically securely transit at least a portion of the communication network 100 (e.g., via a secure tunnel, virtual private network, a direct connection, etc.).

In 5G wireless network development efforts, edge locations may be considered a possible implementation of Multi-access Edge Computing (MEC). Such edge locations can be connected to various points within a 5G network that provide a breakout for data traffic as part of the User Plane Function (UPF). Older wireless networks can incorporate edge locations as well. In 3G wireless networks, for example, edge locations can be connected to the packet-switched network portion of a communication network 100, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC). In some embodiments, traffic between an edge server 224 and the cloud provider network 203 can be broken out of the communication network 100 without routing through the core network.

In some embodiments, edge servers 224 can be connected to more than one communication network associated with respective customers. For example, when two communication networks of respective customers share or route traffic through a common point, an edge server 224 can be connected to both networks. For example, each customer can assign some portion of its network address space to the edge server 224, and the edge server 224 can include a router or gateway 251 that can distinguish traffic exchanged with each of the communication networks 100. For example, traffic destined for the edge server 224 from one network might have a different destination IP address, source IP address, and/or virtual local area network (VLAN) tag than traffic received from another network. Traffic originating from the edge server 224 to a destination on one of the networks can be similarly encapsulated to have the appropriate VLAN tag, source IP address (e.g., from the pool allocated to the edge server 224 from the destination network address space) and destination IP address.

Figure 2B:
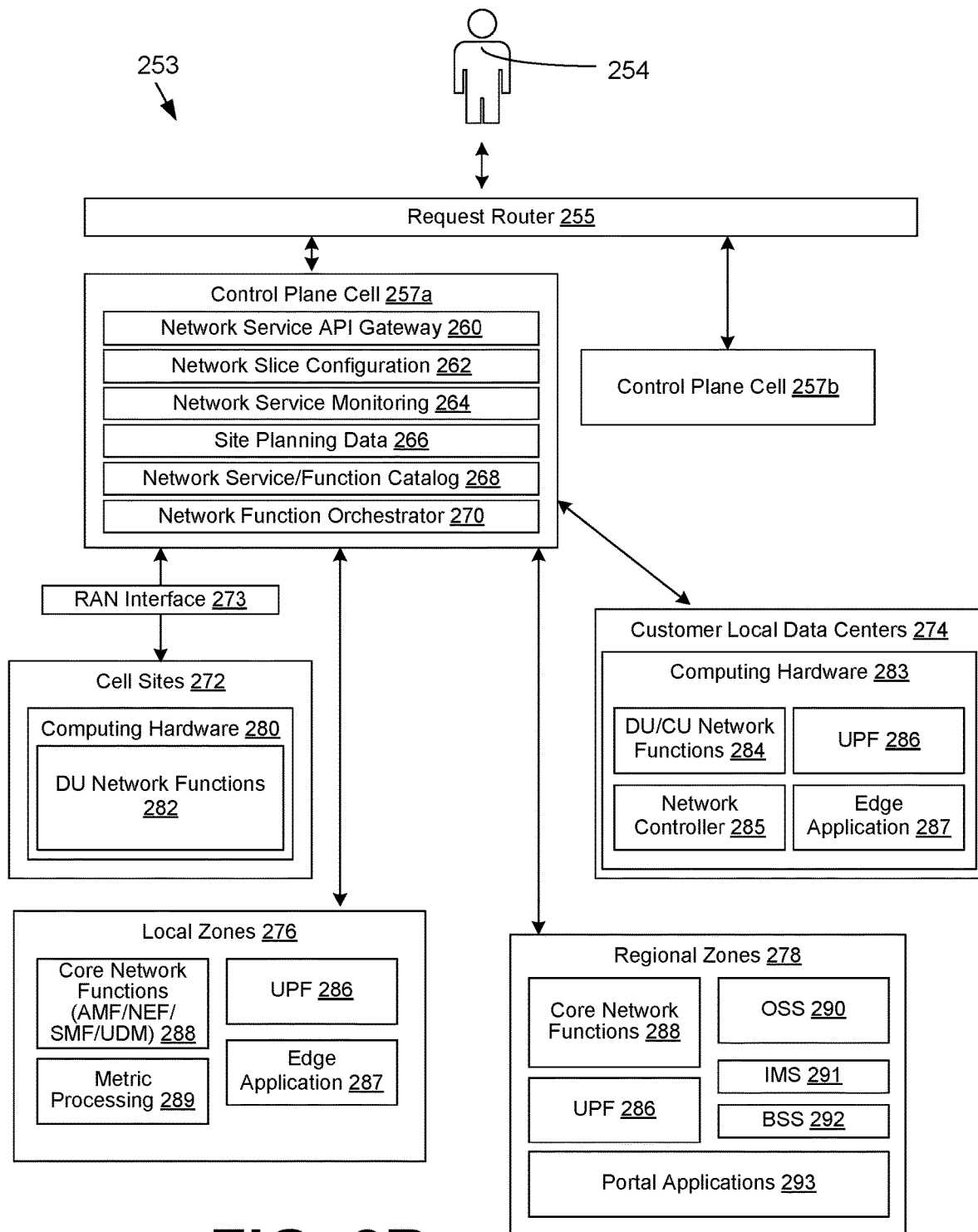
FIG. 2B depicts an example of cellularization and geographic distribution of the communication network of FIG. 1 according to some embodiments of the present disclosure.

FIG. 2B depicts an example 253 of cellularization and geographic distribution of the communication network 100 (FIG. 1) for providing highly available user plane functions (UPFs). In FIG. 2B, a user device 254 communicates with a request router 255 to route a request to one of a plurality of control plane cells 257a and 257b. Each control plane cell 257 may include a network service API gateway 260, a network slice configuration 262, a function for network service monitoring 264, site planning data 266 (including layout, device type, device quantities, etc. that describe a customer's site requirements), a network service/function catalog 268, a function for orchestration 270, and/or other components. The larger control plane can be divided into cells in order to reduce the likelihood that large scale errors will affect a wide range of customers, for example by having one or more cells per customer, per network, or per region that operate independently.

The network service/function catalog 268 is also referred to as the NF Repository Function (NRF). In a Service Based Architecture (SBA) 5G network, the control plane functionality and common data repositories can be delivered by way of a set of interconnected network functions built using a microservices architecture. The NRF can maintain a record of available NF instances and their supported services, allowing other NF instances to subscribe and be notified of registrations from NF instances of a given type. The NRF thus can support service discovery by receipt of discovery requests from NF instances, and details which NF instances support specific services. The network function orchestrator 270 can perform NF lifecycle management including instantiation, scale-out/in, performance measurements, event correlation, and termination. The network function orchestrator 270 can also onboard new NFs, manage migration to new or updated versions of existing NFs, identify NF sets that are suitable for a particular network slice or larger network, and orchestrate NFs across different computing devices and sites that make up the radio-based network 103 (FIG. 1).

The control plane cell 257 may be in communication with one or more cell sites 272 by way of a RAN interface 273, one or more customer local data centers 274, one or more local zones 276, and one or more regional zones 278. The RAN interface 273 may include an application programming interface (API) that facilitates provisioning or releasing capacity in a RAN operated by a third-party communication service provider at a cell site 272. The cell sites 272 include computing hardware 280 that executes one or more distributed unit (DU) network functions 282. The customer local data centers 274 include computing hardware 283 that execute one or more DU or central unit (CU) network functions 284, a network controller 285, a UPF 286, one or more edge applications 287 corresponding to customer workloads, and/or other components.

The local zones 276, which may be in a data center operated by a cloud service provider, may execute one or more core network functions 288, such as an AMF, an SMF, a network exposure function (NEF) that securely exposes the services and capabilities of other network functions, a unified data management (UDM) function that manages subscriber data for authorization, registration, and mobility management. The local zones 276 may also execute a UPF 286, a service for metric processing 289, and one or more edge applications 287.

The regional zones 278, which may be in a data center operated by a cloud service provider, may execute one or more core network functions 288; a UPF 286; an operations support system (OSS) 290 that supports network management systems, service delivery, service fulfillment, service assurance, and customer care; an internet protocol multimedia subsystem (IMS) 291; a business support system (BSS) 292 that supports product management, customer management, revenue management, and/or order management; one or more portal applications 293, and/or other components.

In this example, the communication network 100 employs a cellular architecture to reduce the blast radius of individual components. At the top level, the control plane is in multiple control plane cells 257 to prevent an individual control plane failure from impacting all deployments.

Within each control plane cell 257, multiple redundant stacks can be provided with the control plane shifting traffic to secondary stacks as needed. For example, a cell site 272 may be configured to utilize a nearby local zone 276 as its default core network. In the event that the local zone 276 experiences an outage, the control plane can redirect the cell site 272 to use the backup stack in the regional zone 278. Traffic that would normally be routed from the internet to the local zone 276 can be shifted to endpoints for the regional zones 278. Each control plane cell 257 can implement a "stateless" architecture that shares a common session database across multiple sites (such as across availability zones or edge sites).

Figure 3A:
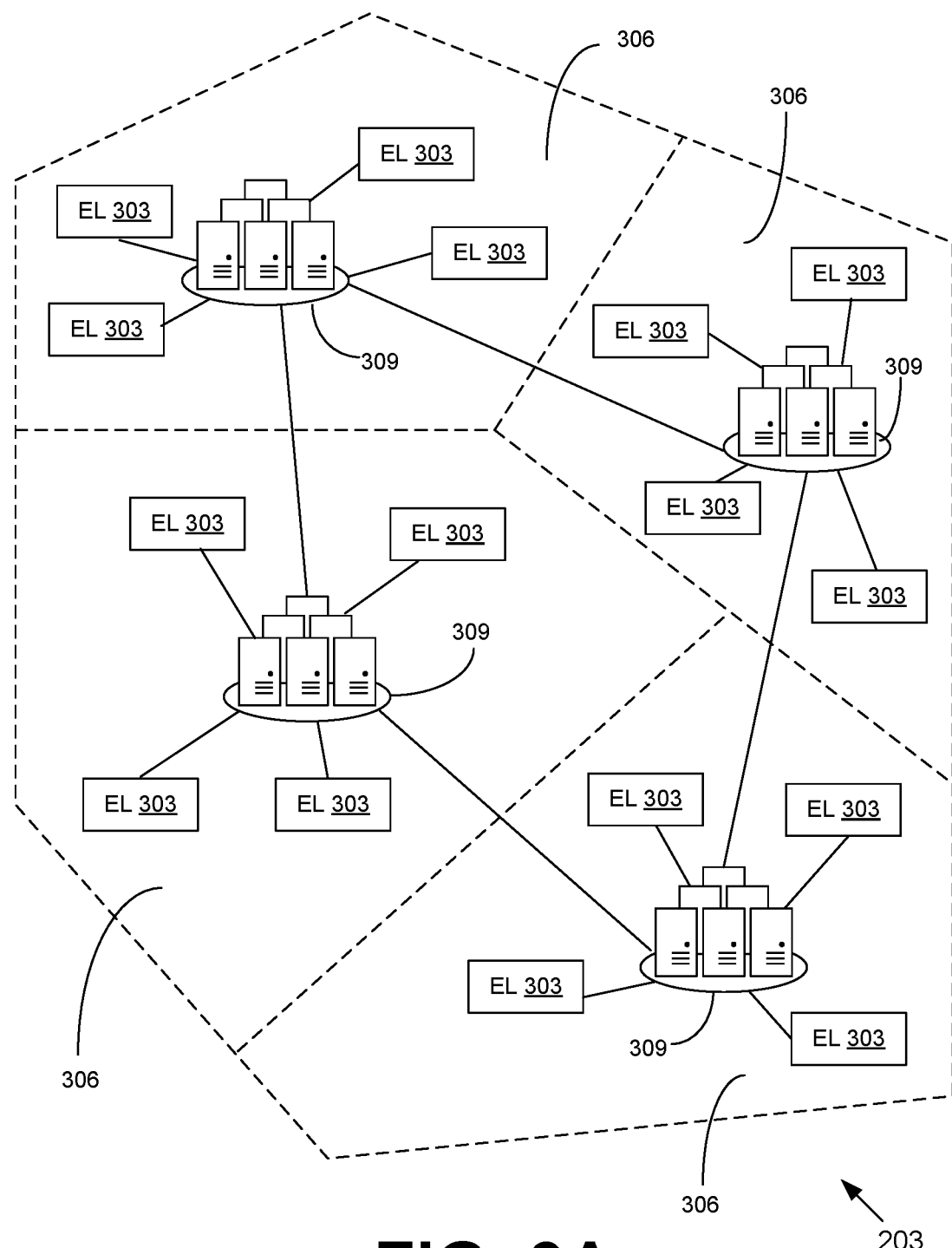
FIG. 3A illustrates an example of the networked environment of FIG. 2A including geographically dispersed edge servers according to some embodiments of the present disclosure.

FIG. 3A illustrates an exemplary cloud provider network 203 including geographically dispersed edge servers 224 (FIG. 2A) (or "edge locations 303") according to some embodiments. As illustrated, a cloud provider network 203 can be formed as a number of regions 306, where a region 306 is a separate geographical area in which the cloud provider has one or more data centers 309. Each region 306 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region 306 far enough away from one another such that a natural disaster, widespread power outage, or other unexpected event does not take more than one availability zone offline at the same time. Customers can connect to resources within availability zones of the cloud provider network 203 via a publicly accessible network (e.g., the Internet, a cellular communication network, a communication service provider network). Transit Centers (TC) are the primary backbone locations linking customers to the cloud provider network 203 and may be co-located at other network provider facilities (e.g., Internet service providers, telecommunications providers). Each region 306 can operate two or more TCs for redundancy. Regions 306 are connected to a global network which includes private networking infrastructure (e.g., fiber connections controlled by the cloud service provider) connecting each region 306 to at least one other region. The cloud provider network 203 may deliver content from points of presence (PoPs) outside of, but networked with, these regions 306 by way of edge locations 303 and regional edge cache servers. This compartmentalization and geographic distribution of computing hardware enables the cloud provider network 203 to provide low-latency resource access to customers on a global scale with a high degree of fault tolerance and stability.

In comparison to the number of regional data centers or availability zones, the number of edge locations 303 can be much higher. Such widespread deployment of edge locations 303 can provide low-latency connectivity to the cloud for a much larger group of end user devices (in comparison to those that happen to be very close to a regional data center). In some embodiments, each edge location 303 can be peered to some portion of the cloud provider network 203 (e.g., a parent availability zone or regional data center). Such peering allows the various components operating in the cloud provider network 203 to manage the compute resources of the edge location 303. In some cases, multiple edge locations 303 may be sited or installed in the same facility (e.g., separate racks of computer systems) and managed by different zones or data centers 309 to provide additional redundancy. Note that although edge locations 303 are typically depicted herein as within a communication service provider network or a radio-based network 103 (FIG. 1), in some cases, such as when a cloud provider network facility is relatively close to a communications service provider facility, the edge location 303 can remain within the physical premises of the cloud provider network 203 while being connected to the communications service provider network via a fiber or other network link.

An edge location 303 can be structured in several ways. In some implementations, an edge location 303 can be an extension of the cloud provider network substrate including a limited quantity of capacity provided outside of an availability zone (e.g., in a small data center 309 or other facility of the cloud provider that is located close to a customer workload and that may be distant from any availability zones). Such edge locations 303 may be referred to as local zones (due to being more local or proximate to a group of users than traditional availability zones). A local zone may be connected in various ways to a publicly accessible network such as the Internet, for example directly, via another network, or via a private connection to a region 306. Although typically a local zone would have more limited capacity than a region 306, in some cases a local zone may have substantial capacity, for example thousands of racks or more. Some local zones may use similar infrastructure as typical cloud provider data centers, instead of the edge location 303 infrastructure described herein.

As indicated herein, a cloud provider network 203 can be formed as a number of regions 306, where each region 306 represents a geographical area in which the cloud provider clusters data centers 309. Each region 306 can further include multiple (e.g., two or more) availability zones (AZs)

connected to one another via a private high-speed network, for example, a fiber communication connection. An AZ may provide an isolated failure domain including one or more data center facilities with separate power, separate networking, and separate cooling from those in another AZ. Preferably, AZs within a region 306 are positioned far enough away from one another such that a same natural disaster (or other failure-inducing event) should not affect or take more than one AZ offline at the same time. Customers can connect to an AZ of the cloud provider network 203 via a publicly accessible network (e.g., the Internet, a cellular communication network).

The parenting of a given edge location 303 to an AZ or region 306 of the cloud provider network 203 can be based on a number of factors. One such parenting factor is data sovereignty. For example, to keep data originating from a communication network in one country within that country, the edge locations 303 deployed within that communication network can be parented to AZs or regions 306 within that country. Another factor is availability of services. For example, some edge locations 303 may have different hardware configurations such as the presence or absence of components such as local non-volatile storage for customer data (e.g., solid state drives), graphics accelerators, etc. Some AZs or regions 306 might lack the services to exploit those additional resources, thus, an edge location could be parented to an AZ or region 306 that supports the use of those resources. Another factor is the latency between the AZ or region 306 and the edge location 303. While the deployment of edge locations 303 within a communication network has latency benefits, those benefits might be negated by parenting an edge location 303 to a distant AZ or region 306 that introduces significant latency for the edge location 303 to region traffic. Accordingly, edge locations 303 are often parented to nearby (in terms of network latency) AZs or regions 306.

Figure 3B:
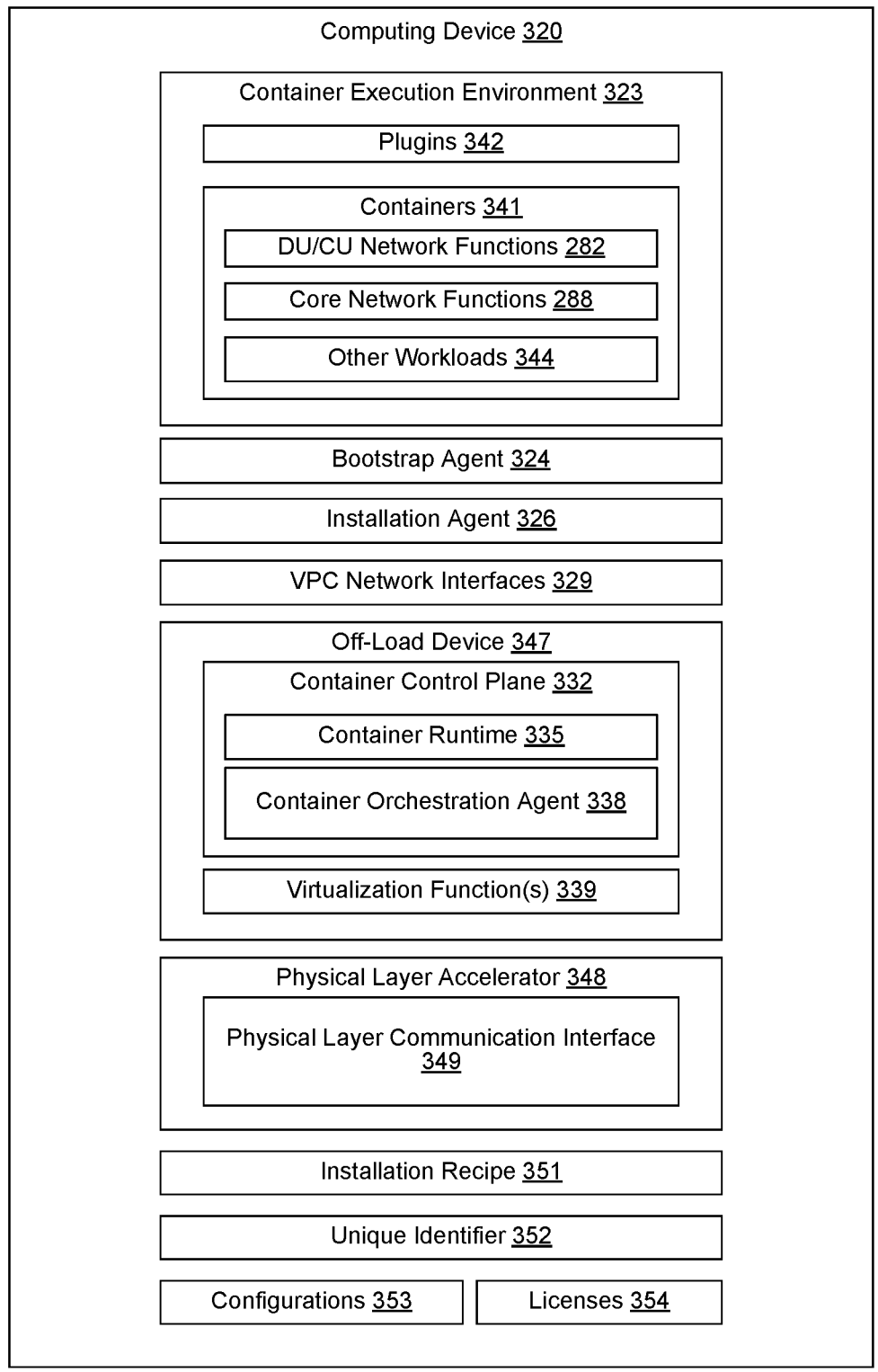
FIG. 3B illustrates an example of a computing device used in the radio-based network of FIG. 1 according to some embodiments of the present disclosure.

Turning now to FIG. 3B, shown is a computing device 320 that can be configured to perform network functions for a radio-based network 103 (FIG. 1) according to one or more embodiments. For example, the computing device 320 may correspond to a distributed computing device 112 (FIG. 1), a centralized computing device 115 (FIG. 1), and/or a computing device implementing one or more core network functions. The computing device 320 may be deployed at an edge location 303 (FIG. 3A), such as a cell site 272 (FIG. 2B). The computing device 320 may be connected to one or more radio units (RUs) of the radio-based network 103 (FIG. 1) via a physical layer communication interface 349. In various embodiments, the computing device 320 may correspond to an edge server 224 (FIG. 2A) of a cloud provider network 203 (FIG. 2A).

The components executed on the computing device 320 may include, for example, a container execution environment 323, a bootstrap agent 324, an installation agent 326, one or more VPC network interfaces 329, a container control plane 332 including a container runtime 335 and a container orchestration agent 338, one or more virtualization functions 339, the physical layer communication interface 349, and/or other components. The container execution environment 323 may be configured to execute a number of different containers 341. In some embodiments, the container execution environment 323 may be executed within a virtual machine instance executed on the computing device 320. In some embodiments, the container execution environment 323 loads one or more plugins 342 that are used for executing containers 341 relating to network functions.

The containers 341 may include containerized versions of network functions such as DU/CU network functions 284 (FIG. 2B) or core network functions 288 (FIG. 2B) in the radio-based network 103. The containers 341 may also correspond to other workloads 344, which may correspond to other functions or portions thereof relating to the radio-based network 103. The other workloads 344 may also correspond to arbitrary customer workloads that are not involved in implementing the radio-based network 103 but may be latency sensitive. Therefore, such customer workloads may benefit from being executed at the edge location 303 rather than elsewhere in the cloud provider network 203 (FIG. 2A).

A container 341, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers 341 at runtime. Containers 341 are thus an abstraction of the application layer (meaning that each container simulates a different software application process). Though each container 341 runs isolated processes, multiple containers 341 can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers 341 can be run on instances that are running a container agent, and some containers 341 can be run on bare-metal servers.

The virtualization functions 339 may correspond to functions that enable one or more virtual machine instances to be executed on the computing device 320. To this end, the virtualization functions 339 may correspond to a hypervisor, an operating system in which the hypervisor is executed, and/or other functions. The virtualization functions 339 may also facilitate access to the VPC network interfaces 329 by virtual machine instances and/or containers 341, including performing functions for the VPC network interfaces 329 such as encapsulation, decapsulation, encryption, decryption, and so on.

In some embodiments, the computing device 320 may include an off-load device 347 and a physical layer accelerator 348. The off-load device 347 and the physical layer accelerator 348 respectively correspond to special purpose computing hardware in the computing device 320. The off-load device 347 and the physical layer accelerator 348 may individually have a separate processor and memory by which to execute virtualization or management functions such as the container control plane 332, the virtualization functions 339, and/or the physical layer communication interface 349 so that the container control plane 332 and the physical layer communication interface 349 not use processor and memory resources of the computing device 320.

In some embodiments, in addition to the physical layer communication interface 349 that optimizes DU to RU Layer 1 communication, the physical layer accelerator 348 may integrate network interface card hardware for one or more inbound and/or outbound network ports. For example, such network ports may correspond to Ethernet ports, fiber optic ports, and so forth.

The computing device 320 includes one or more processors and one or more memories that are coupled to a local hardware interconnect interface such as a bus. The off-load device 347 and the physical layer accelerator 348 are also coupled to the local hardware interconnect interface, for example, by way of a Peripheral Component Interconnect (PCI) or PCI Express (PCIe) bus. For example, the off-load device 347 and the physical layer accelerator 348 may individually correspond to a physical card that is pluggable into a connector on the bus. The processors of the computing device 320, the off-load device 347, and the physical layer accelerator 348 may have different processor architectures. For example, one processor may have an x86 architecture, while the other processor may have an ARM architecture. The off-load device 347 and the physical layer accelerator 348 may individually have a memory that is separate from the memory of the distributed computing device 112.

Non-limiting examples of the container runtime 335 may include containerd, CRI-O, DOCKER, and so on. The container runtime 335 may meet a Runtime Specification of the Open Container Initiative. The container orchestration agent 338 is executed to manage the lifecycle of container 341, including provisioning, deployment, scaling up, scaling down, networking, load balancing, and other functions. Non-limiting examples of commercially available container orchestration agents 338 include KUBERNETES, APACHE MESOS, DOCKER orchestration tools, and so on.

The bootstrap agent 324 is preconfigured on a new or recently commissioned or recommissioned computing device 320 to cause software to be installed and configured on the computing device 320. In response to the computing device 320 being initially powered on and connected to a network, the bootstrap agent 324 may establish a secure communications channel with an automation service of the cloud provider network 203. Once this secure communications channel is established, the automation service may then configure the bootstrap agent 324 to download and install the installation agent 326. The installation agent 326 subsequently downloads, installs, and configures software according to a customer-specified installation recipe 351. The installation agent 326 may be used to facilitate a reset or decommissioning of the computing device 320 and an optional transfer of the computing device 320 to another customer.

A unique identifier 352, such as a hardware identifier in a trusted platform module (TPM) of the computing device 320 or a software identifier stored on the computing device 320, may be used to provide a hardware root-of-trust and/or a software root-of-trust for the bootstrap agent 324 and the installation agent 326. The unique identifier 352 may be associated with the customer upon creation by a manufacturer or other vendor, and a customer may associate a particular installation recipe 351 with the specific hardware identified by the unique identifier 352. The unique identifier 325 may be used to authenticate and verify the identity of the computing device 320 by the automation service of the cloud provider network 203.

The configurations 353 correspond to parameters, settings, and/or other configuration data that the installation agent 326 uses to apply a configuration to the operation of the computing device 320. For example, the configurations 353 may be used to configure DU/CU network functions 282, core network functions 288, other workloads 344, the container execution environment 323, the plugins 342, the VPC network interfaces 329, the off-load device 347, the physical layer accelerator 348, an operating system, one or more microservices, and/or other components of the computing device 320.

The licenses 354 may be downloaded to the computing device 320 by the installation agent 326 in order to facilitate authorized and licensed operation of components on the computing device 320 that require licenses 354. Such licenses 354 may pertain to various components such as DU/CU network functions 282, core network functions 288, other workloads 344, the container execution environment 323, the plugins 342, the VPC network interfaces 329, the off-load device 347, the physical layer accelerator 348, an operating system, one or more microservices, and/or other components of the computing device 320.

The VPC network interfaces 329 provide connectivity between the network functions on the computing devices 320 and other network functions on other computing devices 320 via a virtual private cloud network connection. The VPC network interfaces 329 may also provide connectivity between DU network functions and CU network functions executed by other machine instances or other computing devices in a cloud provider network 203 also using a virtual private cloud network connection.

Figure 4:
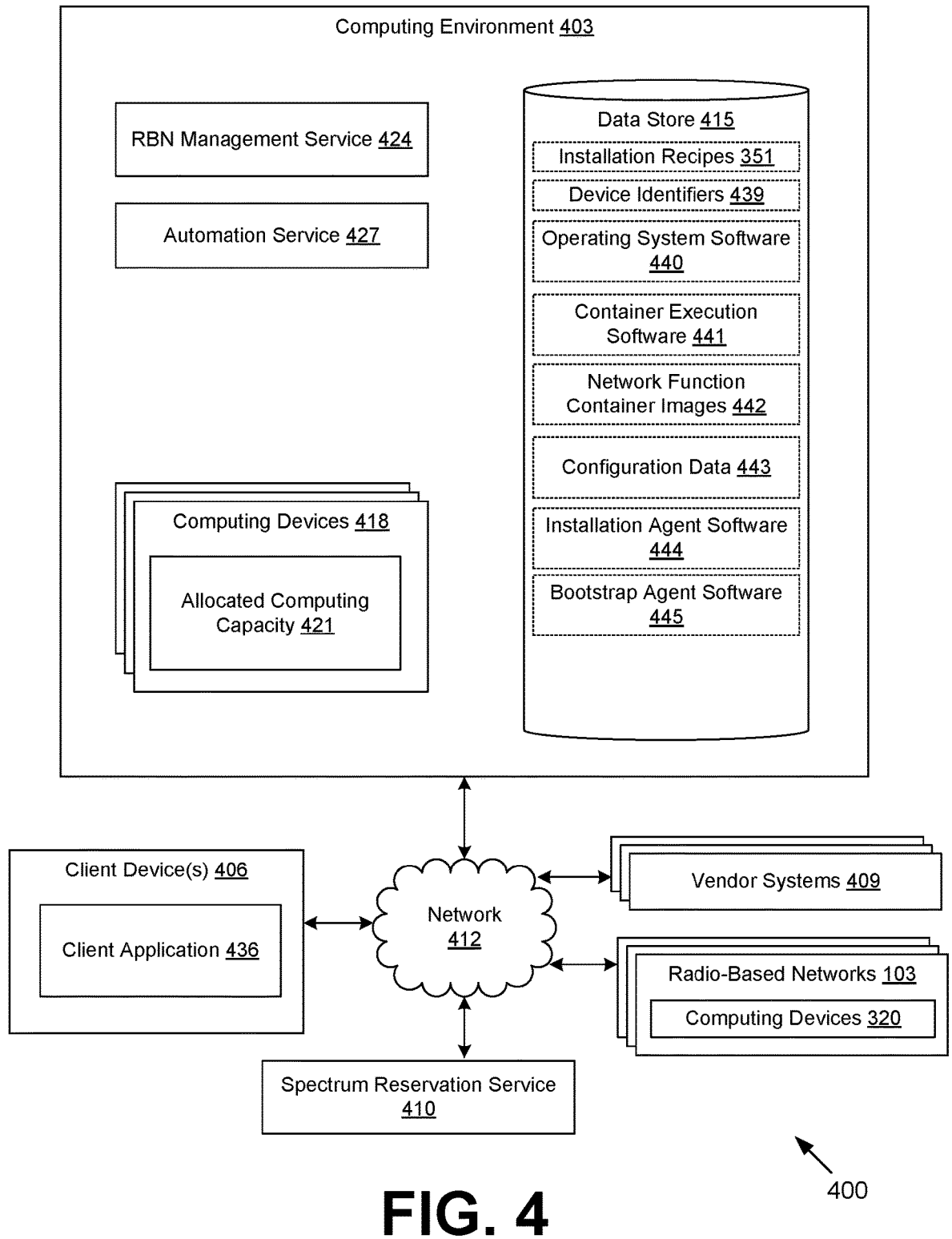
FIG. 4 is a schematic block diagram of the networked environment of FIG. 2A according to various embodiments of the present disclosure.

With reference to FIG. 4, shown is a networked environment 400 according to various embodiments. The networked environment 400 includes a computing environment 403, one or more client devices 406, one or more vendor systems 409, one or more spectrum reservation services 410, and one or more radio-based networks 103, which are in data communication with each other via a network 412. The network 412 includes, for example, the Internet, intranets, extranets, wide area networks (WANs), local area networks (LANs), wired networks, wireless networks, cable networks, satellite networks, or other suitable networks, etc., or any combination of two or more such networks. The vendor systems 409 correspond to manufacturers, distributors, or other suppliers of computing devices 320 or hardware used within the computing devices 320 (such as the off-load device 347 (FIG. 3B) or the physical layer accelerator 348 (FIG. 3B).

The computing environment 403 may comprise, for example, a server computer or any other system providing computing capacity. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource, and/or any other distributed computing arrangement. In some cases, the computing environment 403 may correspond to an elastic computing resource where the allotted capacity of processing, network, storage, or other computing-related resources may vary over time. For example, the computing environment 403 may correspond to a cloud provider network 203, where customers are billed according to their computing resource usage based on a utility computing model.

In some embodiments, the computing environment 403 may correspond to a virtualized private network within a physical network comprising virtual machine instances executed on physical computing hardware, e.g., by way of a hypervisor. The virtual machine instances and any containers running on these instances may be given network connectivity by way of virtualized network components enabled by physical network components, such as routers and switches.

Various applications and/or other functionality may be executed in the computing environment 403 according to various embodiments. Also, various data is stored in a data store 415 that is accessible to the computing environment 403. The data store 415 may be representative of a plurality of data stores 415 as can be appreciated. The data stored in the data store 415, for example, is associated with the operation of the various applications and/or functional entities described below.

The computing environment 403 as part of a cloud provider network offering utility computing services includes computing devices 418 and other types of computing devices. The computing devices 418 may correspond to different types of computing devices 418 and may have different computing architectures. The computing architectures may differ by utilizing processors having different architectures, such as x86, x86_64, ARM, Scalable Processor Architecture (SPARC), PowerPC, and so on. For example, some computing devices 418 may have x86 processors, while other computing devices 418 may have ARM processors. The computing devices 418 may differ also in hardware resources available, such as local storage, graphics processing units (GPUs), machine learning extensions, and other characteristics.

The computing devices 418 may have various forms of allocated computing capacity 421, which may include virtual machine (VM) instances, containers, serverless functions, and so forth. The VM instances may be instantiated from a VM image. To this end, customers may specify that a virtual machine instance should be launched in a particular type of computing device 418 as opposed to other types of computing devices 418. In various examples, one VM instance may be executed singularly on a particular computing device 418, or a plurality of VM instances may be executed on a particular computing device 418. Also, a particular computing device 418 may execute different types of VM instances, which may offer different quantities of resources available via the computing device 418. For example, some types of VM instances may offer more memory and processing capability than other types of VM instances.

The components executed on the computing environment 403, for example, include a radio-based network (RBN) management service 424, a automation service 427, and other applications, services, processes, systems, engines, or functionality not discussed in detail herein.

The RBN management service 424 is executed to provision, manage, configure, and monitor radio-based networks 103 (FIG. 1) that are operated by a cloud service provider on behalf of customers. To this end, the RBN management service 424 may generate a number of user interfaces that allow customers to place orders for new radio-based networks 103 and computing devices 320 to be used in the radio-based networks 103, define installation recipes 351 and apply the installation recipes 351 for orders of computing devices 320, scale up or scale down existing radio-based networks 103, modify the operation of existing radio-based networks 103, configure wireless devices 106 (FIG. 1) that are permitted to use the radio-based networks 103, provide statistics and metrics regarding the operation of radio-based networks 103, reserve frequency spectrum for customer's networks via a spectrum reservation service 410, provision or release capacity in RANs via a RAN interface, and so on. For example, the RBN management service 424 may generate one or more network pages, such as web pages, that include the user interfaces. Also, the RBN management service 424 may support this functionality by way of an API that may be called by a client application 436. In addition to facilitating interaction with users, the RBN management service 424 also implements orchestration of deployments and configuration changes for the radio-based networks 103 and on-going monitoring of performance parameters. In some cases, the RBN management service 424 may generate a network plan for a customer based at least in part in a specification of the customer's location, an automated site survey by an unmanned aerial vehicle, and/or other input parameters.

The automation service 427 is executed to install software on and configure the computing devices 320 in the radio-based networks 103. To this end, the computing devices 320, and specifically the bootstrap agent 324 (FIG. 3B) executed on the computing devices 320, are configured to establish a secure communication channel with the automation service 427 upon start up with a network connection available. The automation service 427 then proceeds to install the installation agent 326 on the computing device 320, which when executed downloads additional software via the automation service 427 and installs and configures the software according to an installation recipe 351.

The data stored in the data store 415 includes, for example, one or more installation recipes 351, one or more device identifiers 439, operating system software 440, container execution software 441, network function container images 442, configuration data 443, installation agent software 444, bootstrap agent software 445, and potentially other data.

The installation recipes 351 are data files or objects that define a set of software and configuration to be installed on a computing device 320. For example, the installation recipe 351 may be created by a customer or the installation recipe 351 may be selected from one or more predefined installation recipes 351. The installation recipe 351 may specify the order of installation and any dependencies that would dictate that certain software be installed before other software. A customer may define a particular installation recipe 351 and then apply that installation recipe 351 to multiple future orders for computing devices 320.

The device identifiers 439 correspond to the unique identifiers 352 (FIG. 3B) of computing devices 320 or hardware within the computing devices 320 as provided by the vendor systems 409, or from the computing environment 403 to the vendor systems 409, through supply chain management systems. Individual device identifiers 439 may be associated with particular customers and installation recipes 351 specified by the customer in order to identify which software and configuration should be installed on the computing device 320.

The operating system software 440 may correspond to different operating systems that can be installed on the computing devices 320. For example, a computing device 320 that is performing DU functions may use a real-time operating system because of the timing requirements of the DU functions. A computing device 320 that is performing core functions may instead use a non-real-time operating system. In some cases, the operating system software 440 may correspond to machine images that can be installed upon the computing devices 320.

The container execution software 441 includes the software relating to the container execution environment 323 (FIG. 3B), the container control plane 332 (FIG. 3B), the container orchestration agent 338 (FIG. 3B), plugins 342 (FIG. 3B) for the container execution environment 323, and so forth.

The network function container images 442 correspond to containers that execute particular network function workloads for a radio-based network 103, such as DU/CU network functions 282 and core network functions 288. In some embodiments, the network functions may be stored and distributed as virtual machine images and/or compute service functions. The configuration data 443 corresponds to configuration settings for the operating system, container execution environment 323, virtual private cloud networks, network functions, and so on. The configurations may be based on default configurations for a specific device function, or the configurations may be customized based on individual customer needs.

The installation agent software 444 is transferred to the computing devices 320 by the automation service 427 so that the installation agent 326 can be installed on the computing devices 320. The bootstrap agent software 445 is transferred to the vendor systems 409 so that the bootstrap agent 324 may be preinstalled on the new or recommissioned computing devices 320. In some cases, the bootstrap agent software 445 may be in the form of a machine image.

The client device 406 is representative of a plurality of client devices 406 that may be coupled to the network 412. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 406 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 436 and/or other applications. The client application 436 may be executed in a client device 406, for example, to access network content served up by the computing environment 403 and/or other servers, thereby rendering a user interface on the display. To this end, the client application 436 may comprise, for example, a browser, a dedicated application, etc., and the user interface may comprise a network page, an application screen, etc. The client device 406 may be configured to execute applications beyond the client application 436 such as, for example, email applications, social networking applications, word processors, spreadsheets, and/or other applications.

In some embodiments, the spectrum reservation service 410 provides reservations of frequency spectrum for customers' use in radio-based networks 103. In one scenario, the spectrum reservation service 410 is operated by an entity, such as a third party, to manage reservations and coexistence in publicly accessible spectrum. One example of such spectrum may be the Citizens Broadband Radio Service (CBRS). In another scenario, the spectrum reservation service 410 is operated by a telecommunications service provider in order to sell or sublicense portions of spectrum owned or licensed by the provider.

Figure 5:
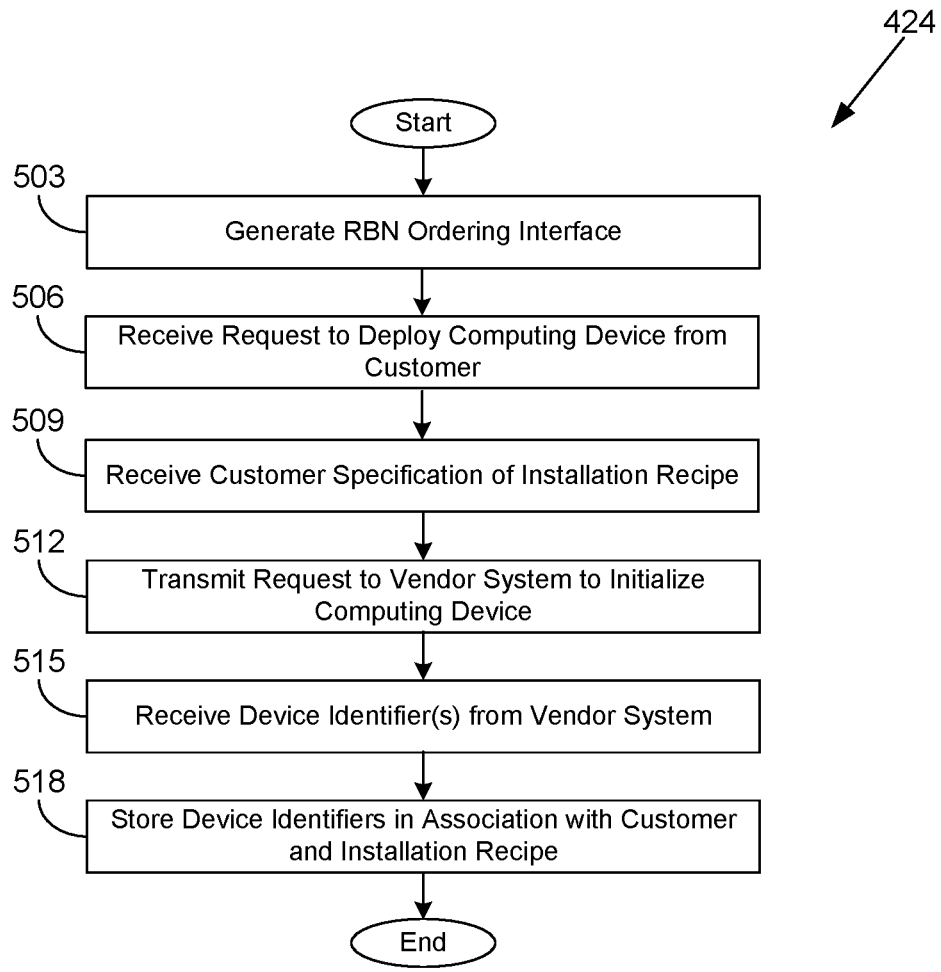
FIGS. 5-6 are flowcharts illustrating examples of functionality implemented as portions of a radio-based network management service or an automation service executed in a computing environment in the networked environment of FIG. 4 according to various embodiments of the present disclosure.

Referring next to FIG. 5, shown is a flowchart that provides one example of the operation of a portion of the RBN management service 424 according to various embodiments. It is understood that the flowchart of FIG. 5 provides merely an example of the many different types of functional arrangements that may be employed to implement the operation of the portion of the RBN management service 424 as described herein. As an alternative, the flowchart of FIG. 5 may be viewed as depicting an example of elements of a method implemented in the computing environment 403 (FIG. 4) according to one or more embodiments.

Beginning with box 503, the RBN management service 424 generates a user interface for ordering or provisioning computing devices 320 (FIG. 3B) used in an RBN 103 (FIG. 1). The user interface may include several options of computing devices 320 with different capabilities and costs. In some cases, the computing devices 320 may be edge servers 224 (FIG. 2A) that are an extension of a cloud provider network 203 (FIG. 2A). In other cases, the computing devices 320 may be an edge server 224 that can operate even when disconnected from the cloud provider network 203, such as a customer-managed edge server 233 (FIG. 2A) that may lack a connection to the cloud provider network 203.

In box 506, the RBN management service 424 receives a request from a customer to deploy a computing device 320. The computing device 320 will be deployed in an RBN 103 of the customer, which in some cases may be managed for the customer by the cloud provider network 203. The request may indicate a type of computing device 320 along with selected features (e.g., processor, memory, storage, add-on cards, etc.). In some cases, the customer may request to order a number of computing devices 320, and the request may specify shipping addresses or the locations in which they will be deployed.

In box 509, the RBN management service 424 receives a customer specification of an installation recipe 351 (FIG. 4). The installation recipe 351 may be defined by the customer interactively in a user interface or via a file format such as extensible markup language (XML), JavaScript object notation (JSON), and so on. Alternatively, the customer may select an installation recipe 351 from a set of default installation recipes 351 corresponding to the types of network functions to be executed on the computing device 320. The customer may store an installation recipe 351 for future use.

In box 512, the RBN management service 424 may transmit a request to one or more vendor systems 409 (FIG. 4) to initialize a computing device 320 with the characteristics selected by the customer. The computing device 320 may be a new computing device 320 or one previously in use and decommissioned. In some cases, one vendor may assemble the computing device 320 from one or more components customized for the customer by one or more other vendors. In initializing or reinitializing the computing device 320, the vendor may install the bootstrap agent software 445 (FIG. 4) on the computing device 320 such that the bootstrap agent 324 (FIG. 3B) executes upon boot and detection of a network connection. The RBN management service 424 may instruct the vendor system 409 where to ship the computing device 320 once it is initialized. In addition, the RBN management service 424 may instruct a vendor system 409 to initialize hardware components of a computing device 320, such as, for example, an off-load device 347 (FIG. 3B) and/or a physical layer accelerator 348 (FIG. 3B).

In box 515, the RBN management service 424 receives one or more device identifiers 439 (FIG. 4) from the vendor system(s) 409. The device identifiers 439 correspond to unique identifiers 352 (FIG. 3B) which may be embodied in hardware such as trusted platform modules (TPM) or device firmware, or in some cases, the unique identifiers 352 may be stored in a data storage device of the computing device 320. In other embodiments, the RBN management service 424 may generate the device identifiers 439 and send them to the vendor system(s) 409 to be included on the hardware of the computing device 320. In various scenarios, a computing device 320 may have multiple unique identifiers 352 for different hardware devices, e.g., one for the processor, one for an off-load device 347 (FIG. 3B), one for a physical layer accelerator 348 (FIG. 3B), and so on.

In box 518, the RBN management service 424 stores the device identifiers 439 in association with the customer and in association with the customer-specified installation recipe 351, which will be used to install software on the computing device 320. The device identifiers 439 form the basis of a hardware root of trust to ensure that only designated computing devices 320 are able to install the software and join the RBN 103 of the customer. Thereafter, the operation of the portion of the RBN management service 424 ends.

Figure 6:
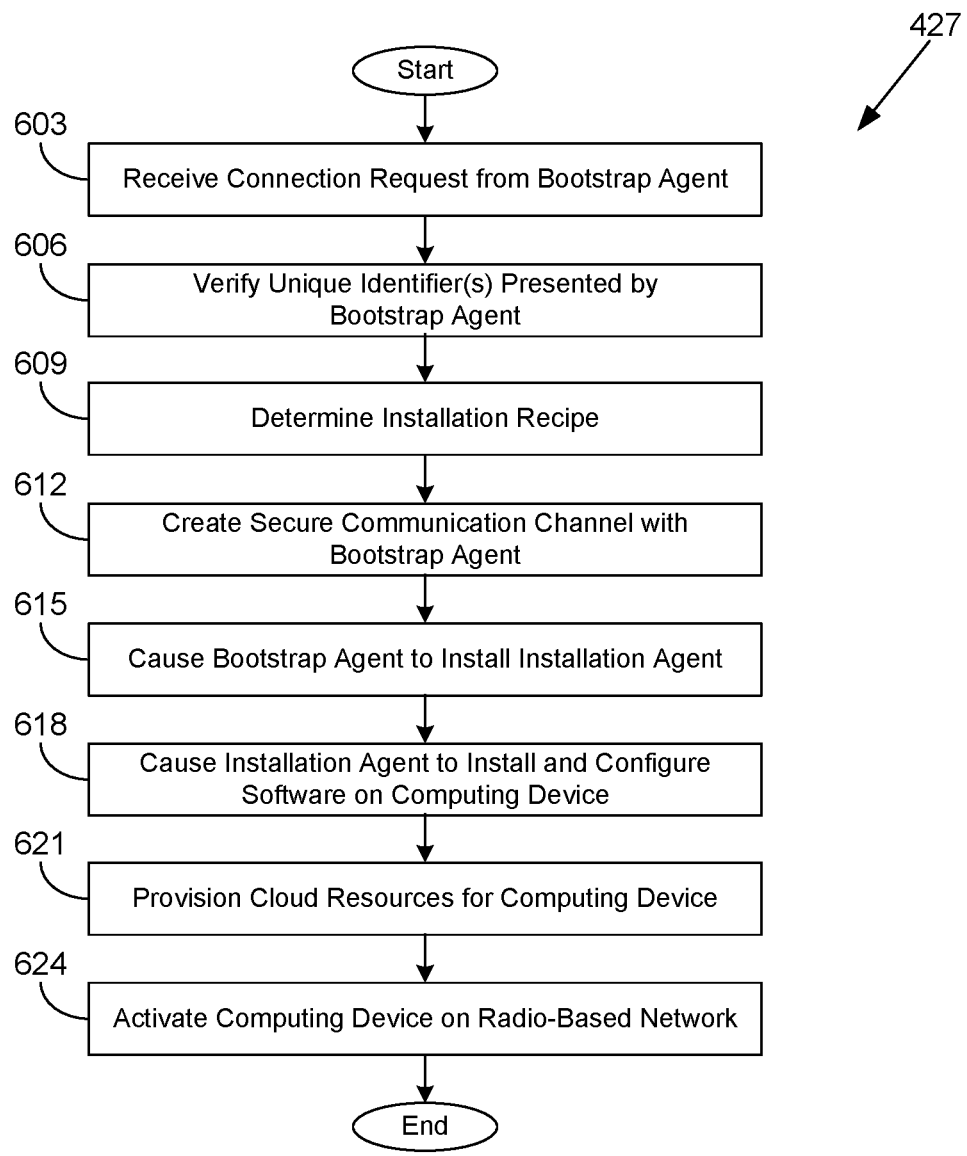

Moving on to FIG. 6, shown is a flowchart that provides one example of the operation of a portion of the automation service 427 according to various embodiments. It is understood that the flowchart of FIG. 6 provides merely an example of the many different types of functional arrangements that may be employed to implement the operation of the portion of the automation service 427 as described herein. As an alternative, the flowchart of FIG. 6 may be viewed as depicting an example of elements of a method implemented in the computing environment 403 (FIG. 4) according to one or more embodiments.

Beginning with box 603, the automation service 427 receives a connection request from a bootstrap agent 324 (FIG. 3B) executed on a computing device 320 (FIG. 3B) that is in an initialized state. The bootstrap agent 324 executes automatically when the computing device 320 is powered on and connected to a network. The connection request may be to establish an encrypted connection such as a transport layer security (TLS) connection, a secure sockets layer (SSL) connection, and so on. In various implementations, the bootstrap agent 324 may utilize, for example, a Preboot Execution Environment (PXE) client, a virtual media mount, or other approaches to remotely boot the computing device 320.

In box 606, the automation service 427 verifies one or more unique identifiers 352 (FIG. 3B) presented by the bootstrap agent 324. In this regard, the automation service 427 may confirm that the presented unique identifiers 352 are in the trusted device identifiers 439 (FIG. 4) that are known to be associated with customers and particularly orders of computing devices 320 by customers. In box 609, the automation service 427 determines an installation recipe 351 that is associated with the computing device 320 and the unique identifiers 352. The installation recipe 351 may be preselected by the customer when the customer placed an order for the computing device 320. It is noted that the association between the installation recipe 351 and the computing device 320 may be late bound or real-time bound to the computing device 320. For example, the customer may make changes to the installation recipe 351 after ordering the computing device 320, potentially after the computing device 320 has been shipped to the customer, up until the time of installation.

In box 612, the automation service 427 creates a secure communication channel with the bootstrap agent 324. The secure communication channel has authenticity of both ends verified and may employ bit-by-bit encryption to encrypt all network traffic between the automation service 427 and the computing device 320.

In box 615, the automation service 427 causes the bootstrap agent 324 to install an installation agent 326 (FIG. 3B). In this regard, the automation service 427 may transfer installation agent software 444 (FIG. 4) to the computing device 320 and cause the bootstrap agent 324 to execute the installation agent software 444 to install the installation agent 326. In some implementations, the installation agent 326 may be configured specifically to the installation recipe 351 specified by the customer.

In box 618, the automation service 427 causes the installation agent 326 to install and configure software on the computing device 320. For example, once the installation agent 326 is installed, the bootstrap agent 324 may be configured to execute the installation agent 326. The installation agent 326 then begins the process of downloading and installing software on the computing device 320 in a defined order from the installation recipe 351. The installation agent 326 may be configured to download particular operating system software 440 (FIG. 4) and install and configure the operating system on the computing device 320. The installation agent 326 may be configured to download container execution software 441 (FIG. 4) to install and configure a container execution environment 323 (FIG. 3B) on the computing device 320. Finally, the installation agent 326 may be configured to download and install one or more network function container images 442 (FIG. 4) and to configure the computing device 320 to perform one or more network functions. Examples of such network functions are described in connection with FIG. 2B and can include a UPF 286 (FIG. 2B), core network functions 288 (AMF, NEF, SMF, and UDM) (FIG. 2B), DU/CU network functions 284 (FIG. 2B), and so on.

In box 621, the automation service 427 may provision one or more cloud resources on a cloud provider network 203 for the computing device 320. For example, the automation service 427 may instantiate machine instances or containers to execute workloads associated with the network functions. The automation service 427 may also reserve resources (e.g., network addresses) within a virtual private cloud network of the customer to which the computing device 320 will be configured to join.

In box 624, after software installation is completed, the automation service 427 activates the computing device 320 on the radio-based network 103 to perform one or more network functions. The automation service 427 may also perform various testing routines to ensure that the computing device 320 has been successfully configured. The automation service 427 may drop the secured communication channel and allow the computing device 320 to connect with one or more other network functions existing on the radio-based network 103 in order to handle network traffic to and from the wireless devices 106 (FIG. 1). Thereafter, the operation of the portion of the automation service 427 ends.

Subsequently, the customer may decide to transfer ownership of the computing device 320 to another organization. If so, the automation service 427 may receive a request from the customer to transfer ownership to another organization or customer. The automation service 427 may then associate the unique identifier 352 of the computing device 320 with the other organization or customer. Then, the automation service 427 may cause the installation agent 326 on the computing device 320 to decommission the computing device 320. For example, the installation agent 326 may wipe the computing device 320 or otherwise reset the computing device 320 to an initial state. Next, the automation service 427 may recommission the computing device 320 for the other organization or customer.

Figure 7:
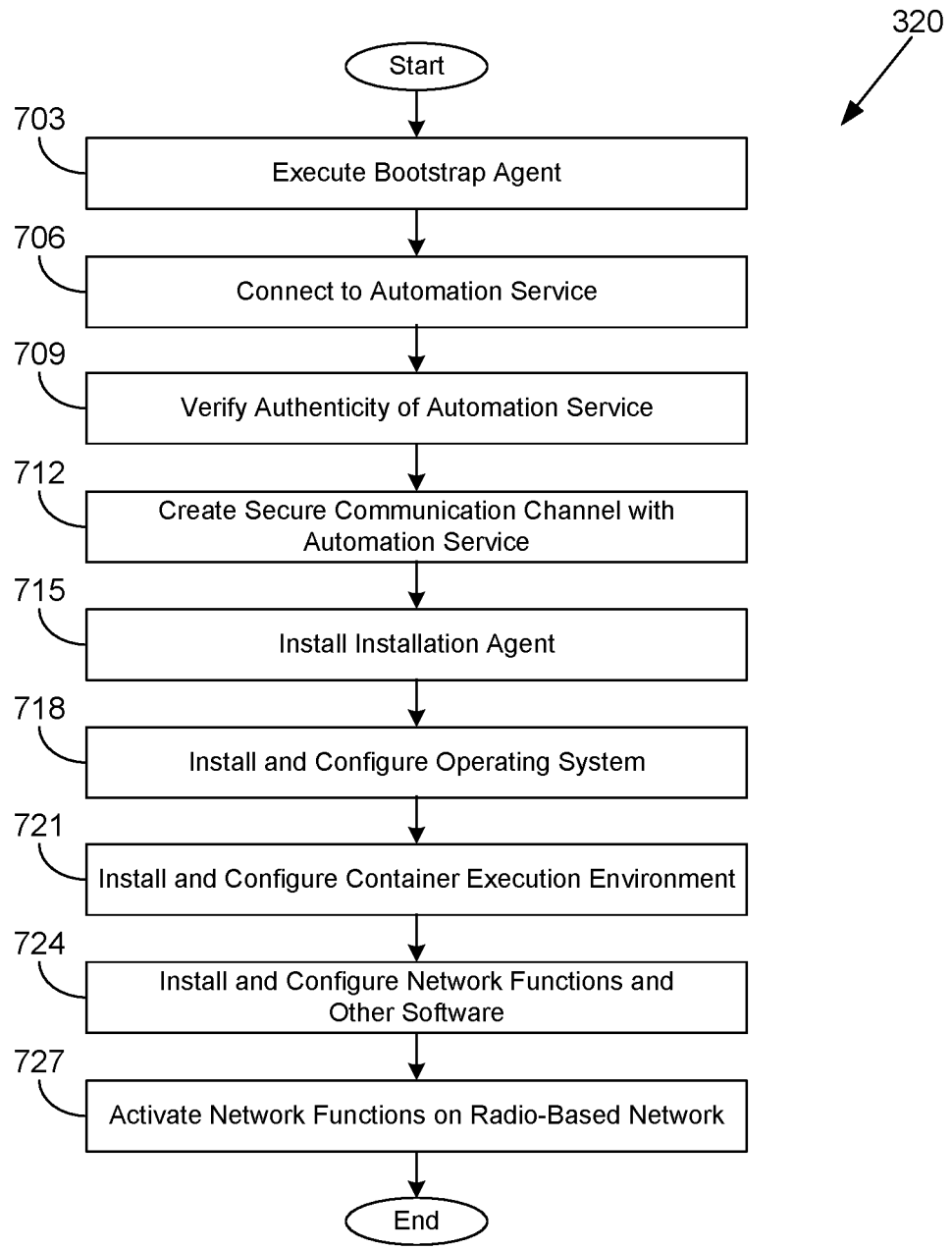
FIG. 7 is a flowchart illustrating an example of functionality implemented as portions of a computing device of FIG. 3B according to various embodiments of the present disclosure.

Continuing to FIG. 7, shown is a flowchart that provides one example of the operation of the computing device 320 according to various embodiments. It is understood that the flowchart of FIG. 7 provides merely an example of the many different types of functional arrangements that may be employed to implement the operation of the portion of the computing device 320 as described herein. As an alternative, the flowchart of FIG. 7 may be viewed as depicting an example of elements of a method implemented in the computing device 320 according to one or more embodiments.

Beginning with box 703, the computing device 320 executes a bootstrap agent 324 (FIG. 3B) in response to the computing device 320 being powered on and connected to a network. The computing device 320 was initialized by a manufacturer or other supplier with the bootstrap agent software 445 (FIG. 4) to execute the bootstrap agent 324. In box 706, the bootstrap agent 324 connects to the automation service 427 (FIG. 4) in the computing environment 403 (FIG. 4). For example, the bootstrap agent 324 may be configured to connect to a predefined domain name or network address corresponding to the automation service 427.

In box 709, the bootstrap agent 324 may verify the authenticity of the automation service 427, for example, by verifying a digital signature or secure certificate presented by the automation service 427. In this way, the bootstrap agent 324 can be assured that it is communicating with the correct automation service 427 and not another system. The bootstrap agent 324 may also present one or more unique identifiers 352 (e.g., from a TPM or device firmware) so that the automation service 427 can verify the identity of the computing device 320.

In box 712, the bootstrap agent 324 creates a secure communication channel (e.g., SSL, TLS, IPSec, etc.) with the automation service 427. This channel may encrypt all network traffic between the computing device 320 and the automation service 427. In box 715, the bootstrap agent 324 installs an installation agent 326 (FIG. 3B) from installation agent software 444 (FIG. 4) provided by the automation service 427. The installation agent 326 is configured to implement a particular installation recipe 351 (FIG. 3B) selected for the hardware by the customer.

In box 718, the installation agent 326 obtains operating system software 440 (FIG. 4) and installs and configures an operating system on the computing device 320. In various scenarios, the operating system software 440 may be obtained from the automation service 427 or a data storage service of the computing environment 403, from a vendor system 409 (FIG. 4) such as the developer of the operating system software 440, or the operating system software 440 may be stored on device storage of the computing device 320. In some cases, the installation agent 326 may install multiple operating systems corresponding to virtual machine instances on the computing device 320. The installation agent 326 may also install and configure a hypervisor to manage machine instances on the computing device 320. The installation agent 326 may also download and apply any software updates for the operating system.

In box 721, the installation agent 326 obtains container execution software 441 (FIG. 4) and installs and configures a container execution environment 323 (FIG. 3B) on the computing device 320. The installation agent 326 may also download and apply any software updates. In some cases, the installation agent 326 may install various plugins 342 (FIG. 3B) to support the operation of network function containers and/or cloud services.

In box 724, the installation agent 326 may obtain one or more network function container images 442 (FIG. 4) and install and configure one or more network functions for the radio-based network 103 (FIG. 1) on the computing device 320. In one example, the installation agent 326 may install a set of DU functions on the computing device 320. Then, the installation agent 326 may configure the set of DU functions to communicate with a set of CU functions via a virtual private cloud network. The installation agent 326 may configure the set of DU functions to communicate with a radio unit co-located at the location of the computing device 320. The installation agent 326 may also install and configure other software, such as microservices or any prerequisites for the network functions, on the computing device 320.

The installation agent 326 may also configure specialized hardware on the computing device 320 to support the network functions, such as the physical layer accelerator 348 (FIG. 3B). The installation agent 326 may preconfigure the network functions with a customer-specific configuration as specified in the installation recipe 351. The installation agent 326 may execute various testing routines to ensure that the network functions will be operational.

In box 727, the installation agent 326 activates the network functions on the radio-based network 103. Thereafter, the operation of the portion of the computing device 320 ends.

Figure 8:
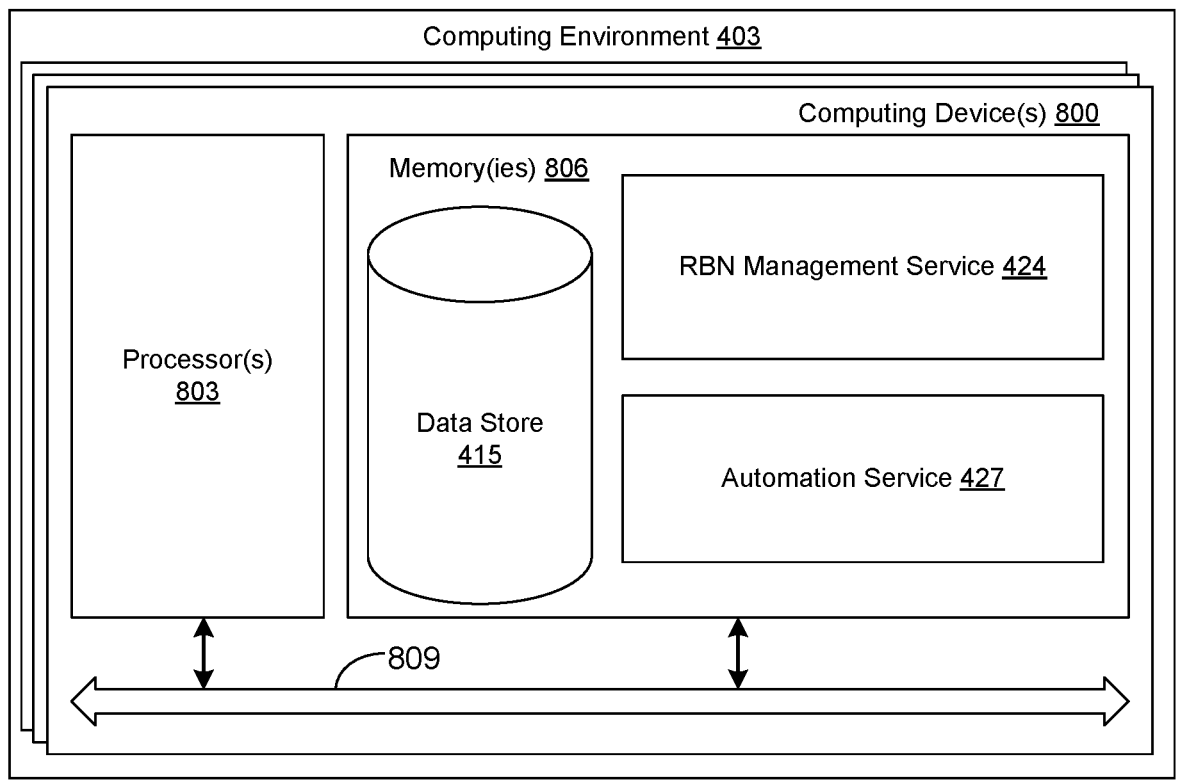
FIG. 8 is a schematic block diagram that provides one example illustration of a computing environment employed in the networked environment of FIG. 4 according to various embodiments of the present disclosure.

With reference to FIG. 8, shown is a schematic block diagram of the computing environment 403 according to an embodiment of the present disclosure. The computing environment 403 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the RBN management service 424, the automation service 427, and potentially other applications. Also stored in the memory 806 may be a data store 415 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the RBN management service 424, the automation service 427, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-7 show the functionality and operation of an implementation of portions of the RBN management service 424, the automation service 427, and the computing device 320. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5-7 show a specific order of execution, it is understood that the order of execution may differ from that which is depicted. For example, the order of execution of two or more blocks may be scrambled relative to the order shown. Also, two or more blocks shown in succession in FIGS. 5-7 may be executed concurrently or with partial concurrence. Further, in some embodiments, one or more of the blocks shown in FIGS. 5-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the RBN management service 424 and the automation service 427, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the RBN management service 424 and the automation service 427, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices 800 in the same computing environment 403.

Unless otherwise explicitly stated, articles such as "a" or "an", and the term "set", should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a first computing device deployed at a location of a customer and initialized with a bootstrap agent, wherein, when the first computing device is powered on and connected to a network, the bootstrap agent is configured to connect to an automation service; and
   a second computing device implementing the automation service and configured to at least:
      receive a connection request from the bootstrap agent;
      verify a unique hardware identifier presented by the bootstrap agent;
      determine an installation recipe associated with the unique hardware identifier and specified by the customer;
      create a secure communication channel with the bootstrap agent;
      cause, via the secure communication channel, the bootstrap agent to install an installation agent on the first computing device; and
      cause, via the secure communication channel, the installation agent to install and configure software on the first computing device that implements one or more network functions for a radio-based network of the customer according to the installation recipe, wherein the installation agent is configured by the installation recipe to at least:
         install a set of distributed unit (DU) functions on the first computing device; and at least one of:
         configure the set of DU functions to communicate with a set of centralized unit (CU) functions via a virtual private cloud network; or
         configure the set of DU functions to communicate with a radio unit co-located at the location of the customer.

2. The system of claim 1, wherein the first computing device includes a physical layer accelerator specialized for distributed unit (DU) physical layer communication.

3. The system of claim 1, wherein the installation agent is configured to preconfigure the one or more network functions with a customer-specific configuration specified in the installation recipe.

4. The system of claim 1, wherein the installation agent is configured to:
   install and configure an operating system on the first computing device, the operating system being indicated by the installation recipe;
   install and configure a container execution environment on the first computing device; and
   wherein the one or more network functions are implemented as one or more containers executable in the container execution environment.

5. The system of claim 1, wherein the second computing device is further configured to at least:
   receive a request from the customer to transfer ownership of the first computing device to another customer;
   associate the unique hardware identifier with the other customer;
   cause the installation agent to decommission the first computing device; and
   cause the installation agent to recommission the first computing device according to another installation recipe associated with the other customer.

6. A computer-implemented method, comprising:
   receiving a request from a bootstrap agent executed in a computing device;
   verifying a unique identifier presented by the bootstrap agent;
   determining an installation recipe associated with the unique identifier and specified by a customer associated with the computing device;
   creating a secure communication channel with the bootstrap agent;
   causing, via the secure communication channel, the bootstrap agent to install an installation agent on the computing device; and
   causing, via the secure communication channel, the installation agent to install and configure software on the computing device that implements one or more network functions for a radio-based network of the customer according to the installation recipe, wherein the computing device includes a physical layer accelerator specialized for distributed unit (DU) physical layer communication.

7. The computer-implemented method of claim 6, wherein the unique identifier is stored by a manufacturer of the computing device in a trusted platform module of the computing device.

8. The computer-implemented method of claim 6, wherein the installation recipe includes one or more network function configurations created by the customer.

9. The computer-implemented method of claim 6, further comprising causing the installation agent to install and configure an operating system specified by the installation recipe on the computing device.

10. The computer-implemented method of claim 6, further comprising causing the installation agent to install and configure a container execution environment on the computing device, the container execution environment being specified by the installation recipe.

11. The computer-implemented method of claim 10, further comprising causing the installation agent to install one or more plugins for the container orchestration environment on the computing device, the one or more plugins being specified by the installation recipe.

12. The computer-implemented method of claim 6, further comprising causing the installation agent to configure the computing device to function as an edge server of a cloud provider network.

13. The computer-implemented method of claim 6, further comprising causing the installation agent to configure the physical layer accelerator, the physical layer accelerator being preinstalled in the computing device.

14. The computer-implemented method of claim 6, further comprising causing the installation agent to configure an off-load device specialized for performing virtualization functions or container management functions for the computing device, the off-load device being preinstalled in the computing device.

15. The computer-implemented method of claim 6, further comprising causing the installation agent to configure the computing device to connect to a virtual private cloud network of the customer.

16. The computer-implemented method of claim 6, further comprising, after installation of the software, causing the computing device to disconnect the secure communication channel and to connect the one or more network functions to the radio-based network.

17. The computer-implemented method of claim 6, wherein the computing device corresponds to a newly manufactured computing device, and the bootstrap agent is preconfigured on the computing device by a manufacturer to execute in response to the computing device being powered on and connected to a network.

18. A computer-implemented method, comprising:

executing a bootstrap agent on a computing device that is in an initial state, the computing device being at a location of a customer;

connecting, by the bootstrap agent, to an automation service in a cloud provider network;

presenting, by the bootstrap agent, a unique identifier of the computing device to the automation service;

receiving, by the bootstrap agent, an installation agent via a secure communication channel from the automation service; and executing the installation agent to obtain, install, and configure software that implements one or more network functions for a radio-based network of the customer, wherein the installation agent installs a set of distributed unit (DU) functions on the computing device, and the installation agent configures the set of DU functions to communicate with a set of centralized unit (CU) functions via a virtual private cloud network, or the installation agent configures the set of DU functions to communicate with a radio unit co-located at the location of the customer.

19. The computer-implemented method of claim 18, further comprising configuring, by the installation agent, a physical layer accelerator specialized for distributed unit (DU) physical layer communication, the physical layer accelerator being preinstalled in the computing device.

20. The computer-implemented method of claim 18, further comprising configuring, by the installation agent, an off-load device specialized for performing virtualization functions or container management functions for the computing device, the off-load device being preinstalled in the computing device.

* * * * *